United States Patent [19]

Newsted et al.

[11] Patent Number: 6,016,467
[45] Date of Patent: Jan. 18, 2000

[54] METHOD AND APPARATUS FOR PROGRAM DEVELOPMENT USING A GRAMMAR-SENSITIVE EDITOR

[75] Inventors: Gary Michael Newsted, Wilton; Richard Eugene Ryen, Atkinson, both of N.H.

[73] Assignee: Digital Equipment Corporation, Houston, Tex.

[21] Appl. No.: 08/863,653

[22] Filed: May 27, 1997

[51] Int. Cl.[7] .................................................. G06F 17/27
[52] U.S. Cl. ................................ 704/9; 707/530
[58] Field of Search ........................ 704/8, 9; 395/708; 707/530, 531, 533; 434/156, 167

[56] References Cited

U.S. PATENT DOCUMENTS

| | | | |
|---|---|---|---|
| 4,931,950 | 6/1990 | Isle et al. | 706/11 |
| 5,128,865 | 7/1992 | Sadler | 704/2 |
| 5,258,909 | 11/1993 | Damerau et al. | 707/533 |
| 5,289,375 | 2/1994 | Fukumochi et al. | 704/2 |
| 5,299,125 | 3/1994 | Baker et al. | 704/9 |
| 5,303,151 | 4/1994 | Neumann | 704/2 |
| 5,317,509 | 5/1994 | Caldwell | 704/9 |
| 5,424,947 | 6/1995 | Nagao et al. | 704/9 |
| 5,799,267 | 8/1998 | Siegel | 704/1 |
| 5,799,269 | 8/1998 | Schabes et al. | 704/9 |
| 5,802,262 | 9/1998 | Van De Vanter | 395/180 |
| 5,805,167 | 9/1998 | Van Cryningen | 345/353 |
| 5,805,832 | 9/1998 | Brown et al. | 711/1 |

OTHER PUBLICATIONS

M. E. Lesk and E. Schmidt, "Lex—A Lexical Analyzer Generator", pp. 113–125.

Stephen C. Johnson, "Yacc: Yet Another compiler–Compiler", pp. 79–111.

*Primary Examiner*—Forester W. Isen
*Assistant Examiner*—Patrick N. Edouard
*Attorney, Agent, or Firm*—Cesari and McKenna, LLP

[57] ABSTRACT

Techniques used in program development using a grammar sensitive editor are described. Input within an edit buffer is processed by a lexical and syntax analyzer in response to various syntactic and lexical states. Actions such as updating various multimedia indices are performed. Users are guided through program development through prompts for menu selection. The items transmitted on the menu are in accordance with the current state of lexical and syntactic processing. If an input in the edit buffer is invalid, the erroneous text is detected via the lexical and syntax analyzers and the erroneous text is highlighted. Additionally, transmitted via the menu is a selection of correct and valid alternatives from which the user may select to be included in the edit buffer.

38 Claims, 17 Drawing Sheets

METHOD AND APPARATUS FOR PROGRAM DEVELOPMENT USING A GRAMMAR-SENSITIVE EDITOR

BACKGROUND OF THE INVENTION

The present invention generally relates to computer systems, and more specifically to performing grammar-sensitive editing in a computer system.

As it is known in the art, writing a program such as one written in a computer program language, often requires using complex notation and a program structure particular to the programming language being used. Programming languages include, for example, the "C", Fortran, and COBOL programming languages. Typically, each particular programming language has its own syntax and structure.

Efficiency in developing programs typically decreases if a programmer is unfamiliar with a new programming language, or a particular area of a programming language. For example, when a new program is written in a different programming language unfamiliar to a computer programmer, the computer programmer has an additional task of learning the different programming language and its particular notation and structure.

Even if a programmer is familiar with a programming language, there are typically certain statements or forms of expressions which are infrequently used by a programmer. Thus, program development even for a knowledgeable programmer generally familiar with a programming language can be inefficient and cumbersome with regard to infrequently used features and statements.

Efficiency in program development also suffers once a new programming language is learned, and then infrequently used. The programmer does not typically retain knowledge of the programming language between infrequent program development sessions.

One technique for program development includes using a programming language manual and performing data entry using a keyboard and terminal as with an editor. Such a technique often proves cumbersome and inefficient for program development, particularly for one who infrequently uses a programming language, or is just learning a programming language.

An alternative technique includes an interface to guide the user through the basic programming structure. One such mechanism includes using menus and forms, such as pull down menus with a graphical user interface. Typically, these menus and forms provide static definitions of language elements, such as programming statements. A static menu definition for a programming statement, as typically appearing on a menu or form, does not change throughout the program development. The static nature of menus and forms does not provide for a context sensitive representation of language elements with a large number of possibilities, as during program development when a user dynamically selects one particular language element. In other words, the static menus are unable to dynamically provide assistance in response to a current context, such as a particular statement being entered or selected by a programmer at a particular point in program development. Proper user assistance depends upon the nature of a problem and also the context in which the problem occurs.

Additional difficulties are typically encountered when on-line assistance is required, such as using a menu with on-line help documentation. In this case, the user generally must search through alphabetized lists for help on a particular language feature taking additional time and further decreasing efficiency.

The foregoing techniques do not provide for such feedback and detection of lexical and syntax errors through dynamic interaction with a user for a particular user context. For example, a user typically inputs source code using either of the foregoing techniques producing a source file which is then compiled. The user is not provided with feedback as to syntax errors until the entire source file is entered and compiled. A lexical error generally occurs with an incorrectly formed language element, such as an invalid character in a lexical token (or "token") representing a variable name, language keyword, or other input. As a result of lexical processing, user input is typically represented as tokens. A syntax error generally involves incorrect placement or omission of one lexical token in relation to another lexical token, such as a missing semicolon (";") in a programming language statement.

It should be noted that the problems previously described are not limited to program development, but are generally applicable to a class of problems in which a user is required to have knowledge as to structure and notation of a document or other form, ranging from filling out a tax form to producing an input file for use in a hardware simulation model.

Thus, there is required a new system for editing which provides for increased efficiency and accuracy in a convenient manner, is flexible and applicable in a wide variety of applications, and promotes productivity by error detection and assisting in error correction, assisting in construction of grammatically correct user input, and providing for exploration of alternative formats of user input.

SUMMARY OF THE INVENTION

In accordance with principles of the present invention, a method executed in a computer system for performing grammar sensitive editing in which the computer system monitors user input and provides feedback, such as suggestions for error correction and subsequent language options, dynamically dependent on the user input is disclosed. A trigger event is detected by monitoring user input. In response to detecting a trigger event, lexical and syntactical analysis is performed on the user input. Upon detection of an erroneous token in the user input, one or more valid language options are transmitted for use in place of the erroneous token. If no erroneous tokens are detected, one or more subsequent valid language options are transmitted.

Further in accordance with principles of the invention, a system for performing grammar sensitive editing is disclosed. A trigger event detector monitors user input for a trigger event. Upon detection of a trigger event, an analyzer performs lexical and syntactical analysis of the user input. A detector coupled to analyzer detects erroneous tokens in the user input. Also coupled to the analyzer is a transmitter which transmits one or more subsequent language options if no erroneous tokens are detected by the analyzer.

Thus, there are provided a new method and system for editing which provides increased efficiency and accuracy in a convenient manner. The new system and method are flexible and applicable in a wide variety of applications to increase productivity by detecting input errors and problems quickly in a timely manner through dynamic user interaction.

BRIEF DESCRIPTION OF THE DRAWINGS

The above-mentioned and other features of the invention will now become apparent by reference to the following description taken in connection with the accompanying drawings in which.

DESCRIPTION OF THE PREFERRED EMBODIMENT

Figure 1:
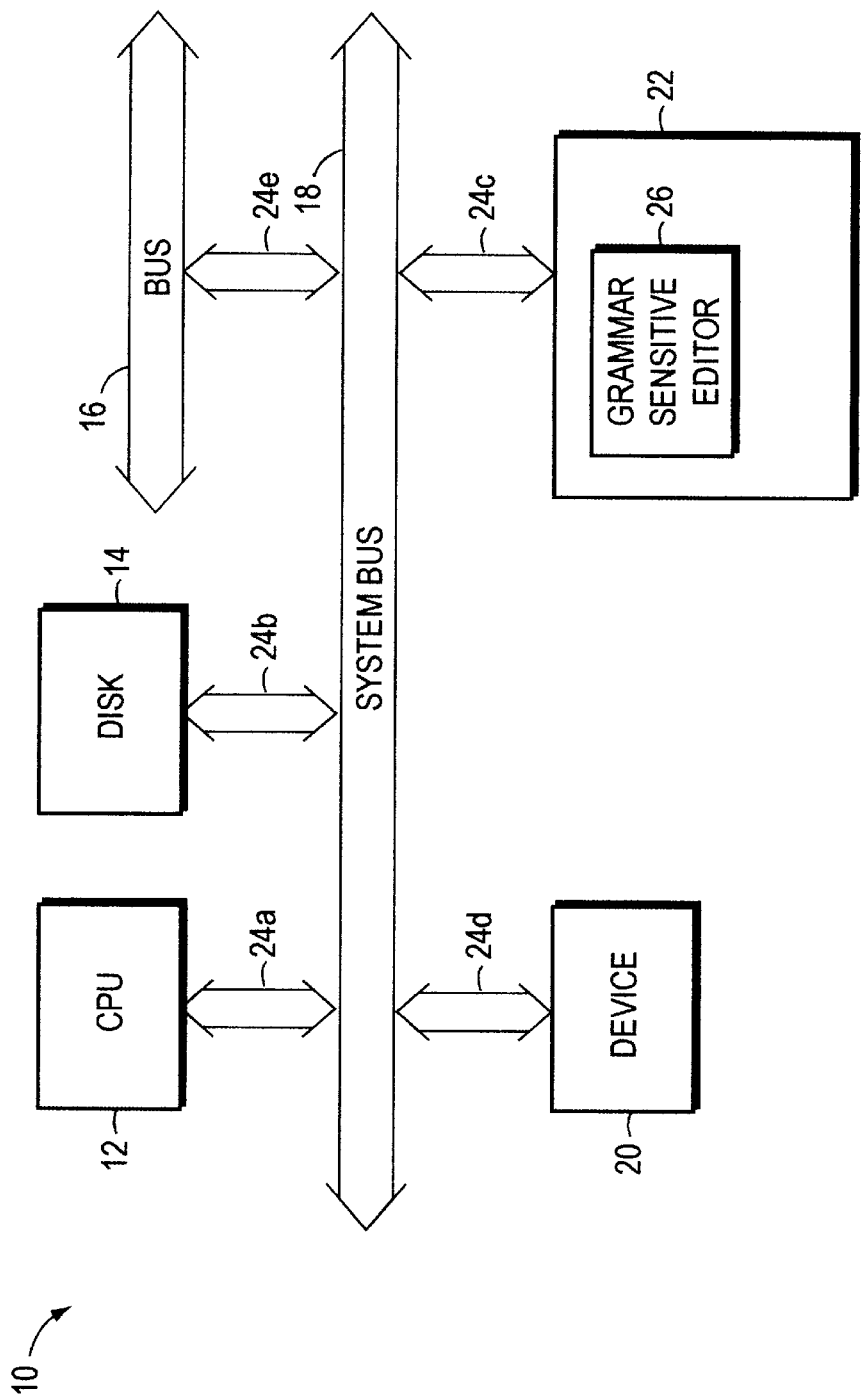
FIG. 1 is a block diagram of a computer system.

Referring now to FIG. 1, an embodiment of a computer system 10 is shown to include a central processing unit (CPU) 12, a computer disk drive 14, a system bus 18, an I/O interface 20, and a main memory 22, each interconnected by system bus 18 via bus interfaces 24a–24d. A second bus 16, such as an I/O bus or another system bus, is also connected to the system bus 18 via bus interface 24e. The CPU, I/O interface, second bus and main memory communicate over the system bus 18. The I/O interface 20 may include, for example, one or more system I/O devices such as a keyboard input device, a pointer device such as a mouse of a pen, a graphical display output device, or a sound generation device, or other multimedia device.

Included in main memory 22 is a grammar sensitive editor 26. Generally, the grammar sensitive editor 26 dynamically responds and provides feedback and analysis information to assist in editing, such as while performing program development. Typically, the grammar sensitive editor 26 includes a menu display or other interface by which to receive input data and transmit output data and other feedback information during program development. Generally, the transmission of output data conveys output data to a user via one of a variety of communication mediums included in the I/O interface 20. One preferred embodiment of a grammar sensitive editor uses menus and a means for selecting options from the menu, for example, using a pointer device such as a mouse of keyboard. The output data may be transmitted for display on a physical display device, such as a terminal screen, or other device, such as a multimedia sound output device. In paragraphs that follow, generally the embodiment refers to transmitting output for use with an I/O interface 20 that includes a physical display device. However, other embodiments incorporating the principles of the invention may include other output devices in the I/O interface 20.

It should be noted that while FIG. 1 shows the grammar sensitive editor (GSE) 26 located in memory 22, the GSE typically includes machine instructions for effectuating the functionalities described when executed by the CPU 12.

Figure 2:
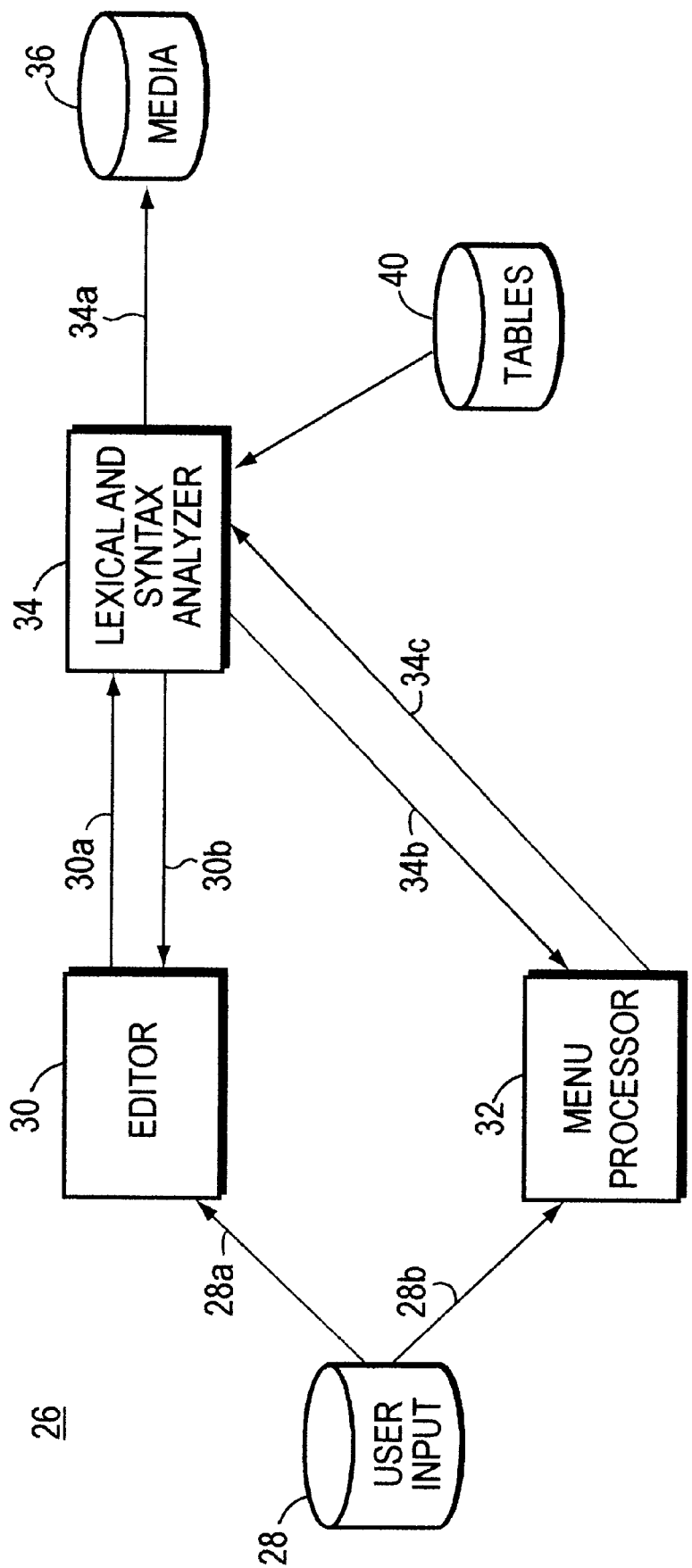
FIG. 2 is a block diagram showing an embodiment of the grammar sensitive editor of FIG. 1.

Referring now to FIG. 2, a block diagram of an embodiment of a grammar sensitive editor 26, as included in main memory 22 of FIG. 1, is shown. FIG. 2 illustrates a relationship among major functional components included in a preferred embodiment of the grammar sensitive editor. User input 28 is input to one of three elements included in the grammar sensitive editor: the editor 30, the menu processor 32, or the lexical and syntax analyzer 34. Generally, user input may include a variety of forms, such as a voice input stream or a stream of characters. Depending upon the type and particular content of the user input, different components of the grammar sensitive editor are activated.

User input 28 may follow path 28b as an input to the menu processor 32 such as when the user selects a menu item using a selection means, such as a keyboard or mouse of the I/O interface 20.

User input 28, such as text for a program being developed, is also typically input 28a using an editor 30. The editor 30 provides text editing operations with an additional extended capability to detect special trigger characters, as is discussed in paragraphs that follow. Upon detection of one of these trigger characters, input from editor 30 passes along path 30a to the lexical and syntax analyzer 34 which performs lexical and syntactical analysis of the user input.

User input 28 may follow path 28c as direct input to the lexical and syntax analyzer 34 causing analysis of a portion of other user input included in the input or edit buffer. This user input is received from an analysis input selection mechanism. For example, a user interface of a preferred embodiment of the grammar sensitive editor may have a graphical user interface display that includes a button which, when selected, causes analysis of a portion of other user input in the edit buffer by the lexical and syntax analyzer. The user input of selecting the button follows path 28c to invoke the lexical and syntax analyzer.

In the foregoing description of one preferred embodiment of the grammar sensitive editor 26, the lexical and syntax analyzer operates in response to various types of trigger events. A trigger event is generally any preselected event in the computer system which causes invocation of the lexical and syntax analyzer. In this instance, a trigger event includes: the detection of a preselected trigger character in the user input, or selection of a button from a graphical user interface of the grammar sensitive editor directly requesting lexical and syntax analysis of the user input included in the edit buffer.

As known to those skilled in art, lexical analysis typically includes detecting language tokens which are typically basic elements of a language, such as valid keywords. Syntactic analysis includes using parsing techniques typically known to those skilled in the art to verify the relationship between various lexical tokens detected during the lexical analysis phase. In other words, the lexical analysis phase checks to see that the basic atomic elements, such as keywords of a language, are proper. The syntactic analysis phase builds upon these valid atomic elements or lexical tokens by further verifying that these tokens are organized in relation to one another, for example, in accordance with rules defining valid programming language statements.

The lexical and syntax analyzer 34 interacts with and outputs information to the editor 30*b,* as needed, such as when detecting an invalid token which needs to be highlighted and redisplayed to the user. Media 36 operates in response to the lexical and syntax analyzer 34. Various forms of media 36 include audio visual aids, such as a help file or a sound file, which is stored on a disk or other storage device within the computer system 10 which includes multimedia devices and services. The sound file, for example, may be played to a user through a multi-media sound device in response to the lexical and syntax analyzer 34. Generally, the types of media 36 are in accordance with the multimedia capabilities of the computer system 10 and may vary with implementation. Throughout descriptions in the following paragraphs, examples of various types of multimedia input and output devices and associated data types that may be used in an implementation in accordance with principles of the invention are set forth.

The lexical and syntax analyzer 34 uses previously produced tables 40 as an input while performing lexical and syntactical analysis. The lexical and syntax analyzer interacts with the menu processor 32 on path 34*b* and 34*c* to display valid menu options.

The tables 40 generally include lexical and syntactical information, such as information about lexical tokens, grammar states and grammar rules which are used by the lexical and syntax analyzer 34. The tables 40 are described in more detail in paragraphs below.

Figure 3:
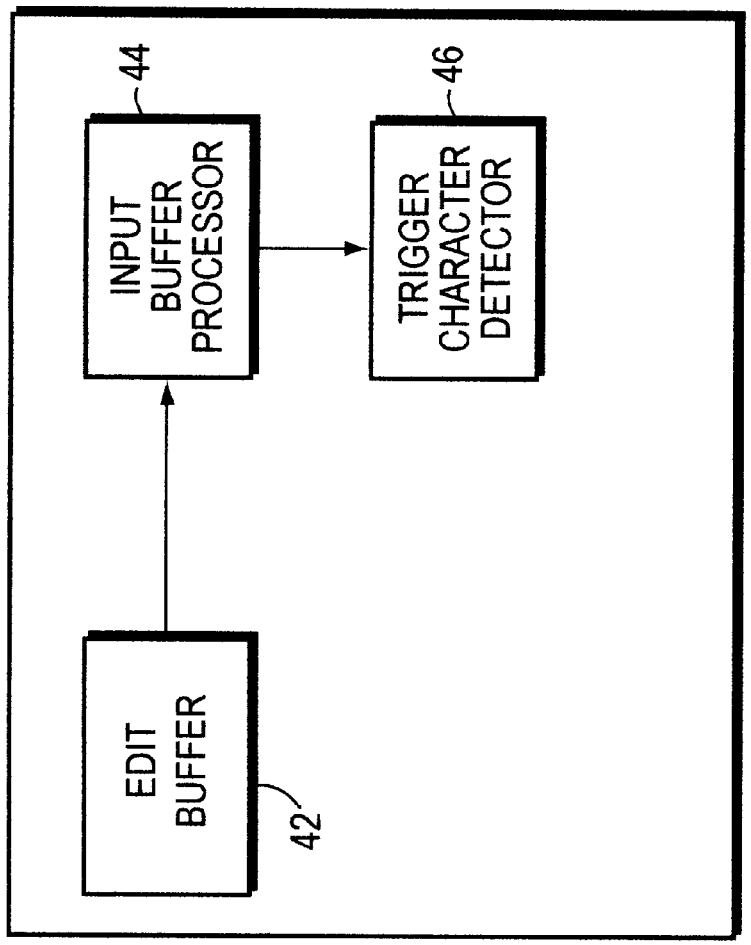
FIG. 3 is a block diagram of an embodiment of the editor of FIG. 2.

Referring now to FIG. 3, an embodiment of an editor 30 as depicted in FIG. 2 is shown. A preferred embodiment of the editor 30 includes an edit buffer 42, an input buffer processor 34, and a trigger character detector 46. The edit buffer 42 corresponds to a location in memory to which user input, such as text characters input from a keyboard or a mouse, are typically stored. The input buffer processor 44 reads the input from the edit buffer or input buffer 42. The user input 28 input from the edit buffer 42 passes through the input processor to the trigger character detector 46.

Functionally, the trigger character detector 46 detects special characters referred to as "trigger characters". The trigger character detector 46 monitors the contents of the edit buffer 42 to detect the "triggers" or "trigger characters". Trigger characters are a set of predefined punctuation characters and language specific token separators, for example, such as a space (" ") or a semi-colon(";") separating various language tokens, such as keywords. Each time a trigger character is detected, control passes from the editor to the lexical and syntax analyzer 34 to process the contents of the edit buffer 42.

Figure 4:
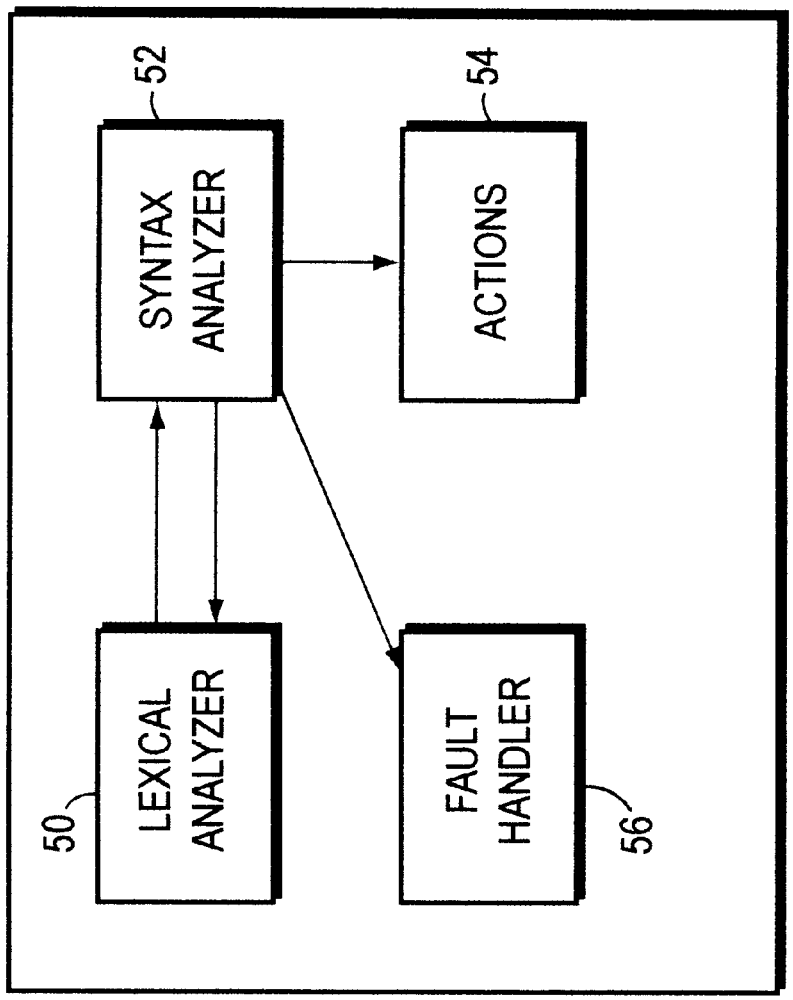
FIG. 4 is a block diagram of an embodiment of the lexical and syntax analyzer of FIG. 2.

Referring now to FIG. 4, an embodiment of a lexical and syntax analyzer of FIG. 2 is shown. The lexical and syntax analyzer 34 includes a lexical analyzer 50, a syntax analyzer 52, action routines 54, and a fault handler 56. As previously described, the lexical analyzer 50 performs lexical analysis upon the user input 28. The lexical analyzer, as is known to those skilled in the art, typically forms "lexical tokens" (or "tokens") which are subsequently input to the syntax analyzer 52. The syntax analyzer 52 performs syntactic analysis of a stream of lexical tokens from the lexical analyzer and accordingly, interacts with the lexical analyzer to receive more tokens as needed in performing the syntactical analysis.

In response to the syntax analyzer 52 performing syntactical analysis, various action routines 54 may be called. For example, an action routine may update an index or pointer to a help file in response to a processing state of the syntax analyzer 52. Upon the syntax analyzer 52 reaching a particular processing state, an action routine 54 updates the help index included in the media 36. Another action routine may playback a prerecorded sound stored in a sound file, or other multimedia output also included on media 36. The syntax analyzer also interacts with a fault handler 56, such as when an error is detected in response to various states resulting from syntactic analysis performed by the syntax analyzer 52. The general effect to a user who is editing is dynamically provided assistance in response to user events. For example, voice instructions or help file pages are displayed as the user enters input using a keyboard.

Figure 5A:
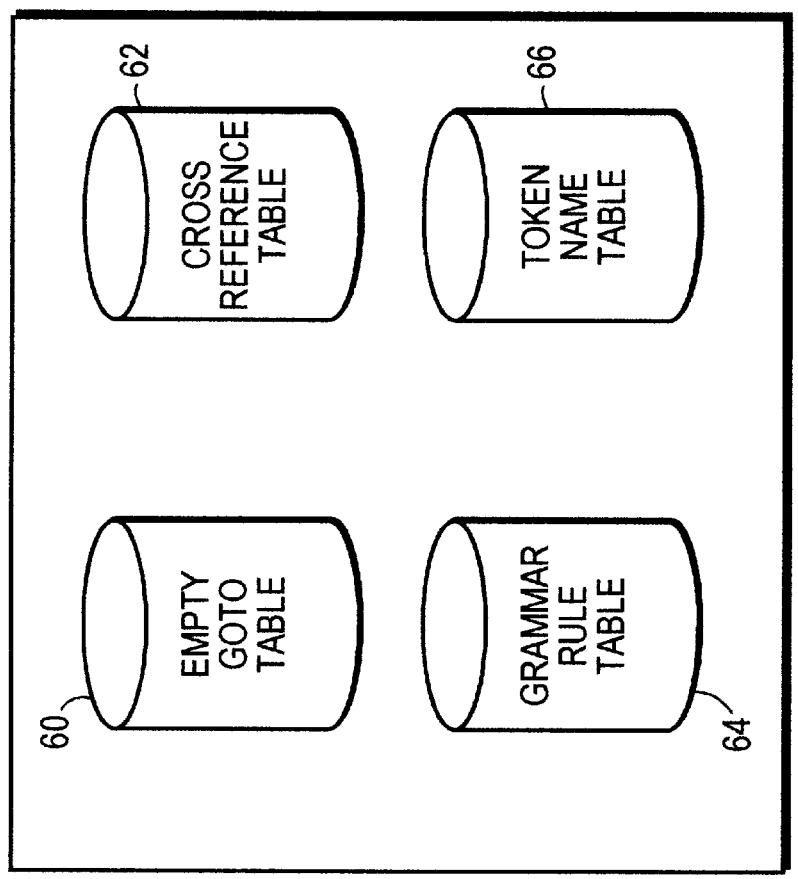
FIG. 5A is a block diagram of an embodiment of the tables used by the lexical and syntax analyzer as shown in FIG. 2.

Referring now to FIG. 5A, a block diagram of an embodiment of the tables 40 used by the grammar sensitive editor 26 are shown. In this particular embodiment, four tables are used by the grammar sensitive editor. Note that an embodiment may use additional and different tables than those of FIG. 5A. However, as shown in FIG. 5A, these four tables are particular to performing the lexical and syntactical analysis in this preferred embodiment. Each of these tables may be stored, for example, in the computer system 10 in a data file on a storage device.

The grammar sensitive editor uses an empty-goto table 60, a cross reference table (CREF) 62, a grammar rule table (GRT) 64, and a token name table 66. Before proceeding further with a description of these tables, it is necessary to first describe how an input language processed by the grammar sensitive editor may be represented.

As known to those skilled in the art, a grammar is typically used to define valid programming language syntax. A grammar, such as a context free grammar, is generally defined by a set of "nonterminal symbols", a set of "terminal symbols", one or more "grammar rules" (or "rules"), and a "start symbol". Generally, using a grammar, a string of terminal symbols is derived from the start symbol. Beginning with the start symbol and applying grammar rules, nonterminal symbols are expanded and replaced with other nonterminal symbols and terminal symbols. The grammar rules are repetitively applied to each nonterminal symbol until all nonterminal symbols have been expanded and replaced with terminal symbols.

In accordance with one embodiment of the grammar sensitive editor, nonterminal symbols and terminal symbols, as defined in accordance with the grammar rules, are displayed to the user via output in menu form. Generally, a user is presented with a list of items in a visual form (such as upon a graphical display device), sound form (such as upon an auditory output device), or other form. For example, a response system may present a pre-recorded audio menu to a user. Furthermore, the user may select from the audio menu via tone recognition techniques, as used with a telephone menu selection. Nonterminal symbols selected, for example, from the menu, are expanded using the appropriate grammar rules into other nonterminal symbols and terminal symbols to form a valid correct program. In this embodiment, a valid and grammatically correct program represents a set of terminal symbols. Subsequent menu items displayed are generally dependent upon prior menu selections and user input analysis. For example, selection of a menu item which is a nonterminal results in display of another menu including items based upon expansion of the selected nonterminal.

Generally, a left hand side (LHS) of a grammar rule contains a nonterminal symbol which is replaced during expansion of the nonterminal symbol with the right hand side (RHS) of a grammar rule. The RHS of a grammar rule typically comprises zero or more nonterminals and zero or more terminal symbols, or a special representation of an empty grammar rule. Note that an empty grammar rule and its uses in this embodiment are explained below.

In text that follows, an example grammar is shown which produces strings comprising letters "c", "d", and "e". The notation used to describe the grammar is based on a notation referred to as BNF (Backus-Naur Form). In this and other examples of grammar rules, BNF notation is used to generally set forth and describe rules of a grammar. This notation is not necessarily a syntactically correct example for any particular tool used in an embodiment described herein.

Example Grammar

```
nonterminal symbols = {<A>, <B>, <C>, <D>}
terminal symbols = {c,d,e}
start symbol = {<A>}
grammar rules =
    1    <A>    :    <B>e
    2    <B>    :    <D>dd
    3    <B>    :    <C>cc
    4    <C>    :    cc
    5    <D>    :    d
    6    <D>    :    <D>d
```

The above Example Grammar includes six grammar rules. The GRT 64 in a particular embodiment would contain a representation of these grammar rules to represent a language which produces terminal symbols "c", "d", and "e" in accordance with these grammar rules. As previously described, a programming language, for example, is represented by various nonterminal and terminal symbols. The terminal symbols represent, for example, valid source code as entered by the user via edit buffer 42 as user input 28. As will be seen in paragraphs that follow, a program of terminal strings is developed through analysis and through various user selections of terminal and nonterminal symbols.

In the foregoing Example Grammar, applying grammar rules 1, 2, and 5 produces the string "ddde". (Note that the "string" is also referred to as "terminal string" or a "string of terminals"). The grammar describes what valid strings can be produced by selecting and applying various grammar rules. When there is more than one grammar rule which can be applied to a non terminal, such as rules 2 and 3 when expanding nonterminal "<B>", only one of rules 2 or 3 is selected, for example, by the user via a menu selection.

Typically, a grammar is used within a compiler to recognize a syntactically valid program and detect syntax errors, as known to those skilled in the art. For example, string "ddde" can be validated using rules 1, 2, and 5 in parsing techniques known in the art. However, within a preferred embodiment of the grammar sensitive editor 26, a grammar is used to assist a user in performing various editing tasks, such as program development. In the foregoing example grammar, a set of valid strings is described and produced by applying grammar rules. In an embodiment of the grammar sensitive editor 26 which is described further in text that follows, a grammar is used to describe source programs which are valid in a particular programming language.

For a particular programming language, the GRT 64 contains those grammar rules that adequately describe a valid source program, as would be syntactically recognized as valid by a compiler for that particular programming language.

The GRT 64 consists of various nonterminal and terminal symbols forming various rules representing a grammar used by the grammar sensitive editor 26.

The token name table 66 is used by the grammar sensitive editor to distinguish terminal symbols from nonterminal symbols. In this particular embodiment, the token name table contains those lexical symbols which are terminal symbols. Therefore, if the grammar sensitive editor needs to determine whether a particular symbol is a terminal or a nonterminal symbol, the token name table 66 is searched. If the name of a symbol is found within the token name table, the symbol is determined to be a terminal symbol. Otherwise, the symbol determined to be a nonterminal symbol.

The empty-goto table 60 is used to restore the analysis processing to a particular state. In a particular embodiment, as is described in following text, the empty-goto table 60 is used to restore the analysis state of user input when a user chooses to skip an optional argument. Functionally, the empty-goto table 60 identifies grammar rules containing "empty rules" or "null rules" which occur when a RHS of a grammar rule contains the null character. An argument which is optional in a program statement has such a corresponding null grammar rule. Generally, the empty-goto table identifies a state to which the analyzer is restored when a corresponding empty rule or optional rule is selected, as by skipping an optional argument. In other words, the empty-goto table specifies an alternate state at which to resume analysis when a choice is made to skip an optional argument.

When performing syntactical analysis as performed by the syntax analyzer 52 of FIG. 4, various states of the analysis correspond to a particular grammar rule or rather a particular terminal or nonterminal symbol, which represent the state of processing user input 28.

Figure 5B:
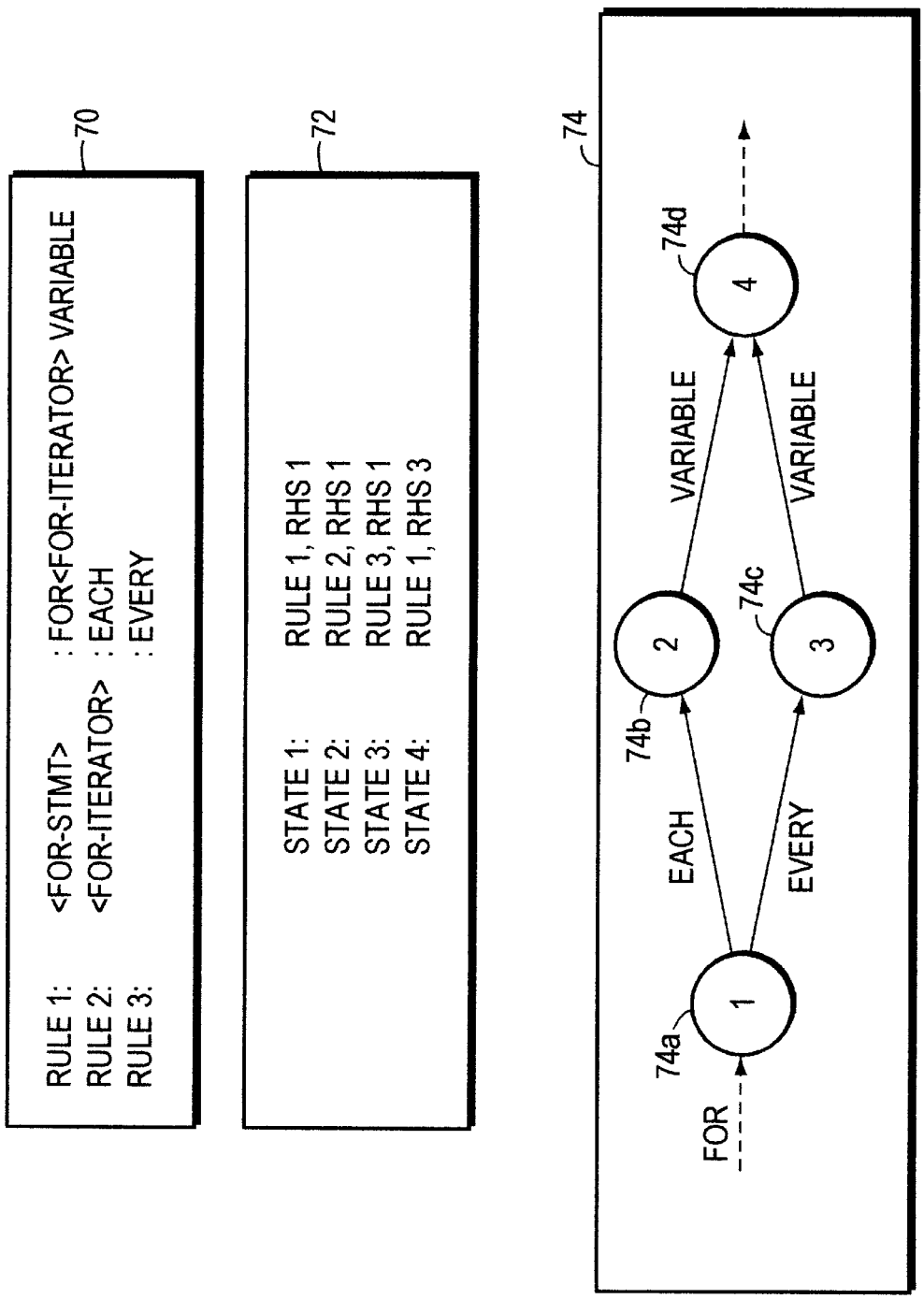
FIG. 5B is a block diagram of an embodiment of a portion of a finite state machine in which a grammar state has a corresponding grammar rule and associated symbol.

Referring now to FIG. 5B, a block diagram of an embodiment of how a programming language grammar rule corresponds to a particular state is shown. A set of three (3) grammar rules defining syntax of a FOR statement as might be included in a programming language are depicted as element 70. These rules are described using the previous notation for nonterminal and terminal symbols as in the Example Grammar described above. Element 72 includes four states which corresponds to various rules from element 70. Element 74 pictorially shows the various states, and how, during the analysis phase, the transition occurs from one state to another. For example, if user input 28 includes the statement "FOR EACH X" entered using editor 30, control proceeds to the lexical and syntax analyzer 34 which performs lexical and syntactical analysis of this statement, upon detection of each of the three (3) trigger characters (i.e., in this case, spaces) by the editor 30. The lexical analyzer 50 forms tokens from the input stream representing the words "FOR", "EACH", and "X". These lexical tokens are subsequently input to the syntax analyzer 52, which uses the various files as detected in FIG. 5A in performing syntactical analysis. In particular, the rules of 70 are included in the GRT 64. The token name table 66 includes those symbols considered to be lexical tokens or terminal symbols, such as keywords "EACH" and "EVERY". (Note that the token name table 66 would not contain the variable "X", but an example mechanism for processing variables is described in later text.)

The CREF table 62 maps an analysis state or a syntactic state number to a particular grammar rule, which represents that syntactic state. Using the example of FIG. 5B, the CREF table 62 contains a representation of the state-to-rule mappings as shown in element 70. Since the grammar operates using the various state numbers, a mapping provides for retrieval of the appropriate grammar rules, such as by displaying the correct terminal and nonterminal symbols of a grammar rule for selection via a menu.

Detailed steps as to how this analysis is performed by the lexical and syntax analyzer of the grammar sensitive editor 26, as well as how the various files are created and used within this analysis phase is described in paragraphs that follow.

Figure 6:
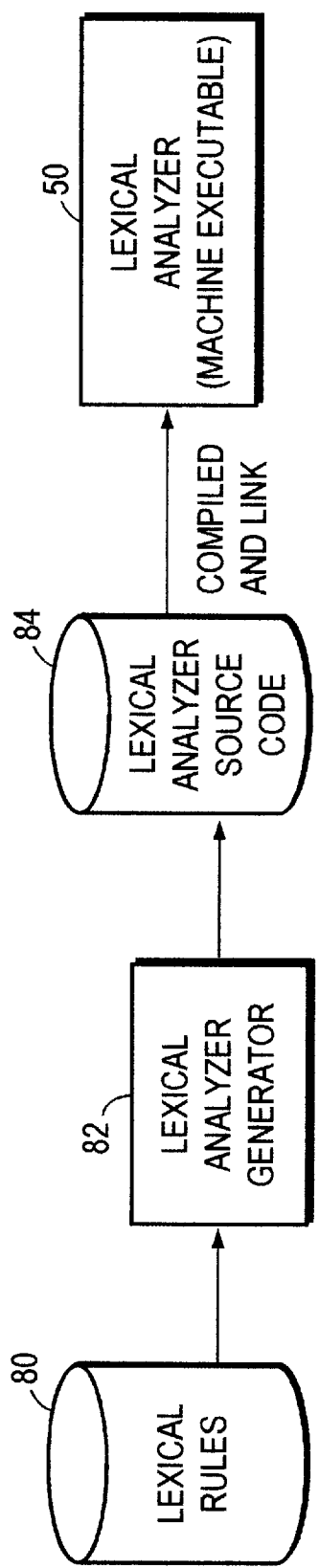
FIG. 6 is a data flow diagram depicting an embodiment of a method for producing a lexical analyzer.

Referring now to FIG. 6, shown is a block diagram of an embodiment of a method for producing a lexical analyzer. One method of producing a lexical analyzer uses the tool known as LEX, as available in standard Unix™ implementations known to those skilled in the art. The method which will now described for producing the lexical analyzer is generally a method applicable when using the LEX tool. As known to those skilled in the art, a different lexical analyzer can be used and produced using various methods. Described herein is one preferred embodiment of a lexical analyzer and one method for producing the lexical analyzer as used within the grammar sensitive editor 26.

In one embodiment, lexical rules 80 are defined and input to a tool called the lexical analyzer generator 82 (LEX) which produces lexical analyzer source code 84. The lexical analyzer source code 84 is subsequently compiled and linked to produce a lexical analyzer machine executable 50. Generally, lexical rules 80 are defined using an input mechanism as recognized by the lexical analyzer generator 82 for those characters in the input stream which form valid lexical tokens. For example, a valid lexical token is a variable name. The lexical rules included in file 80 define a valid lexical token corresponding to a variable name as a series of letters and digits wherein the first character of a variable name must be a letter. Using these lexical rules 80, the lexical analyzer generator 82 produces lexical analyzer source code 84 in a programming language, such as the "C" programming language.

Lexical analyzer machine executable 50, as produced by compiling and linking of the lexical analyzer source code 84, is used to recognize and form valid lexical tokens from user input in accordance with the lexical rules 80. As an example, the lexical analyzer 50, when executed, may take as an input a user input stream and recognize validly formed lexical tokens. Additionally, a lexical analyzer may also generate lexical errors if a particular stream of user input characters does not form a valid lexical token. For example, when forming a variable name, if the lexical analyzer encounters a question mark ("?"), the lexical analyzer may generate a lexical error for the invalid lexical token if a question mark ("?") is an invalid character in a variable name.

Figure 7:
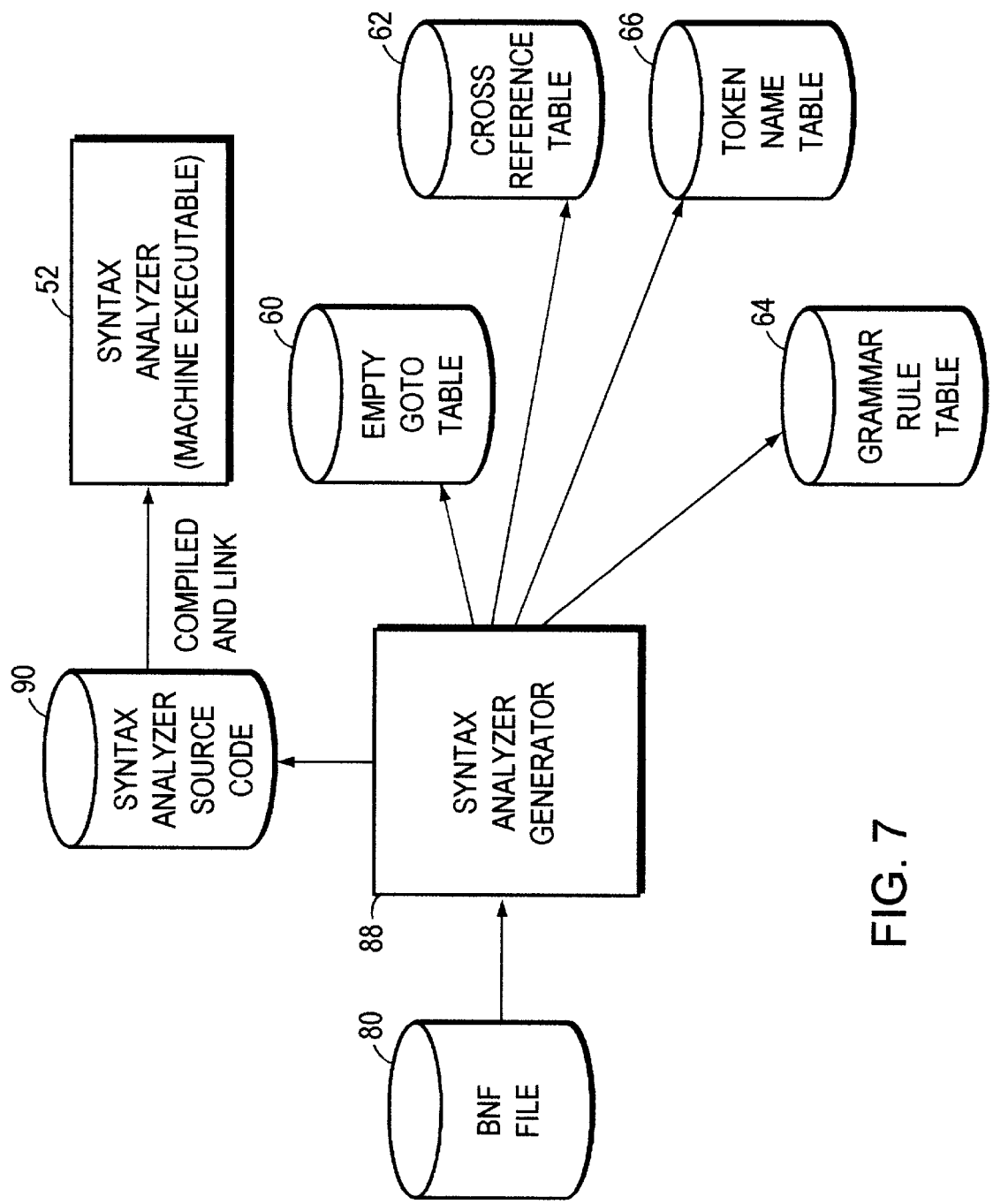
FIG. 7 is a data flow diagram depicting an embodiment of a method for producing a syntax analyzer machine executable and the tables of FIG. 2.

Referring now to FIG. 7, shown is a block diagram of an embodiment of a method for producing the syntax analyzer 52. In this embodiment, the various tables 40 of FIG. 5A are also produced using this method. FIG. 7 is a data flow diagram depicting a method of producing a syntax analyzer machine executable 52 using YACC, a tool available in standard Unix™ implementations known to those skilled in the art. In this embodiment, YACC is used to produce a parser that performs grammatical analysis or syntax analysis upon a lexical token input stream, such as that produced by the lexical analyzer 50 previously described in FIG. 6. It should be noted that the syntax analyzer generator must include certain functional features as is described in paragraphs that follow.

In this particular embodiment which uses YACC, certain enhancements and modifications are made to YACC to produce the necessary files and operate properly within the embodiment described for the grammar sensitive editor 26 in FIG. 1. These changes and modifications are noted in following discussions.

The syntax analyzer generator 88 takes as an input a BNF file 86 which includes grammar rules in a format which are read and interpreted by the syntax analyzer generator 88 (YACC). Generally, the BNF file includes data describing grammar rules written in a form of BNF notation known to those skilled in the art. In turn, the syntax analyzer generator produces five outputs. The syntax analyzer source code 90 is produced, which is then compiled and linked to form the syntax analyzer machine executable 52. Additionally, the syntax analyzer generator 88 in this particular embodiment produces the four files of FIG. 5A, the empty-goto table 60, the CREF table 62, the token name table 66, and the GRT 64. The GRT 64 and the token name table 66 are typically produced by a version of YACC as included in the standard Unix™ implementations. It should be noted that these tables are typically deleted after the syntax analyzer source code has been produced. However, since this embodiment uses these tables, special parameters are specified in the invocation of YACC causing retention of these tables. In this particular embodiment YACC is the syntax analyzer generator 88 and modifications are also needed to this syntax analyzer generator 88 to produce the empty-goto table 60 and the CREF table 62.

As previously described, the precise use of the empty-goto table 60 and the CREF table 62 will become more apparent in following descriptions. In this particular embodiment, to generate the CREF table, a new module is written and included into the source code for the YACC utility. In the following description, this new module is called "custom". The code included in the "custom" module searches YACC's internal data structures which contain the syntactical state numbers. From these internal data structures, "custom" extracts the necessary values corresponding to the appropriate grammar rule number and RHS symbol associated with the particular state.

In this particular embodiment, YACC's "main" routine calls a sequence of routines. One of these routines is called an "output" routine. The call to the "custom" routine is preferably inserted prior to the call to the "output" routine to ensure that YACC's data structures contain the appropriate values to produce the CREF table in addition to the syntax analyzer source code typically produced. In summary, the input or index value of the CREF table is the state number corresponding to a particular state of the analysis in accordance with a grammar. Given the state number, the CREF table maps the state number to two index values: a grammar rule number, and an integer indicating a RHS symbol of the grammar rule to which the corresponding state is associated.

Using the appropriate rule number and RHS number obtained from the CREF table, for a predefined structure of the GRT 64, the syntax analyzer machine executable 52 obtains the appropriate symbols for a given state to be displayed from the GRT 64 as discussed below.

The syntax analyzer generator 88 needs additional modifications to produce the empty-goto table in this particular embodiment. As previously described, the empty-goto table 60 is used by the syntax analyzer machine executable 52 when a user chooses to skip inclusion of an optional argument, such as included in a programming language statement.

It should be noted that in a typical compiler, the fact that an optional argument is skipped may be detected by examining the next input symbol. However, because the embodiment being described herein processes input while being entered, the embodiment cannot look ahead into the input stream to determine if the optional argument is skipped. To properly manage the analysis state in the event that an optional argument is skipped, the empty-goto table is used.

In this particular embodiment, the empty-goto table 60 is produced by including additional code physically following the code of the "custom" routine which creates the CREF table 62. Portions of this code are included in following text. The code which creates the empty-goto table 60 uses a data structure internal to YACC identifying those rules having a RHS which is an "empty rule". In this particular embodiment the BNF file 86 which is input to the syntax analyzer generator (YACC) 88 contains rules defined in a particular format in which an optional rule is denoted as having no RHS argument for a corresponding LHS nonterminal. This is illustrated in the following example.

| | | | |
|---|---|---|---|
| 1. | LHS | : | RHS_arg1 |
| 2. | LHS | : | RHS_arg2 |
| 3. | LHS | : | |

In the foregoing example, a corresponding LHS or nonterminal expands to various RHS arguments, denoted "RHS_argXX" above. Similarly, the left hand side nonterminal symbol is denoted "LHS" in the above example. In accordance with rule 3, the LHS expands to an "empty rule", as indicated by the empty right-hand portion of rule 3 following the vertical bar. Internal to YACC, this empty rule is known as a "null" rule and a "null" rule structure exists within YACC identifying those empty rules. In this embodiment, the empty-goto table 60 is produced by extracting information from YACC's "null" rule list.

The following is an example portion of code written in a C-style notation similar to the commercially available "C" programming language. Source code based on the following example may be included in a "custom" routine for producing the CREF table and the empty-goto table in view of the foregoing descriptions.

CODE EXAMPLE 1: CUSTOM ROUTINE CODE
```
/*output_custom.c*/
output_custom( )
#include "defs.h"
{
    register int I;
    register int j;
    register int k;
    register int s;
    register int rule;
    register int nnulls;
    register action *p;
    register short *sp;
    register short *sp1;
    register core *statep;
    register int g;
    register int h;
    short   *null_rules;
    int kk;
    int ii;
```

-continued

```
/* CREATE CROSS REFERENCE TABLE */
    fprintf(output_file, "\n/* State-Grammar Cross Reference Table*/\n");
    fprintf(output_file, "/*-----------------------------*/\n");
                        /*output number of rules and tokens */
    fprintf(output_file, "int MAXRULES = %d;\n",nrules-2);
    for (I = 0, s = 2; s < ntokens; ++s)
        if (symbol_value[s] > I) I = symbol_value[s];
        fprintf(output_file, "int MAXTOKENS = %d;\n",I);
    fprintf(output_file,"struct cref {\n");    /* Define CREF Struct*/
    fprintf(output_file,"    short rule; \n");
    fprintf(output_file,"    char term;\n");
    fprintf(output_file,"  } yycref[] = {");
    outline += 9;
    for (h = -1,s = 0; s < nstates; s++) /* Populate CREF table */
    {
        statep = state_table[s]; /* For each state in the table  */
        if (h < 10) ++h;         /* Handle horizontal spacing    */
        else                     /* Create ten columns */
        {
            ++outline;
            putc('\n',output_file);
            h = 1;
        };
        sp1 = sp = ritem + statep->items[0];  /* Get item
                                                 (symbol) list  */
        while (*sp >= 0) ++sp;                /* Sync pointer    */
        rule = -(*sp);
        /* Determine current rule   */
        for (I = 0,sp = ritem + rrhs[rule]; sp < sp1; I++,sp++);
        /* Count rhs arg seen */
        if (!s) fprintf(output_file,"%73c%3d,%2d},\n", '{',rule-2,i);
        /* Output cross ref. line*/
        else fprintf(output_file,"{%3d,%2d}, ",rule-2,i)
    };
    fprintf(output_file,"{ 0, 0}};\n\n");       /* Terminate cref */
    outline += 2;
/* CREATE EMPTY GOTO TABLE */
    null_rules = (short *) MALLOC(nrules*sizeof(short));
                        /* Use YACC's Null Rule table */
    if (null_rules == 0) no_space( );
    fprintf(output_file,"\n/* Empty Rule Destination Table */\n");
    fprintf(output_file, "/*--------------------------------*/\n")
    fprintf(output_file,"struct EGO {\n");/* Define yyego struct */
    fprintf(output_file,"    int state; \n");
    fprintf(output_file,"    short rule; \n");
    fprintf(output_file,"  } yyego[] = {"};
    outline += 7;
    for (h = -1,s = g = 0; s < nstates; s++)/* Populate Empty Goto Table
                                                                    */
    {
        nnulls = 0;
        for (I = 0, p = parser[s]; p; p = p->next)
    /* Locate NULL rules */
        {
            if (p->action_code == REDUCE &&
                (p->suppressed == 0 || p->suppressed == 1))
            {
                I = p->number;
                if (rrhs[i] + 1 == rrhs[i+1])  /* Load next RHS term */
                {
                    for (j = 0; j < nnulls && I > null_rules[j]; ++j) continue;
                    if (j == nnulls)
                    {
                        ++nnulls;
                        null_rules[j] = I;
                    }
                    else if (I != null_[rules[j])
                    {
                        ++nnulls;
                        for (k = nnulls - 1; k > j; --k)
                            null_rules[k]= null_rules[k-1];
                        null₁.rules[j] = I;
                    };
                };
            };
        };
        for (I = 0; I < nnulls; ++I)      /* Output Error-GOTO data */
        {
            if (h < 10) ++h;   /* Handle horizontal spacing */
            else
```

-continued

```
    {
      ++outline;
      putc('\n',output_file);
         h = 1;
      };
    j = null_rules[i];
      if (!g) fprintf(output_file,"%92c%4d,%3d},\n", '{',s,j-2);
                             /* Output table line*/
      else fprintf(output_file, "{%4d,%3d}, ",s,j-2);
      g++;
      };
    };
    FREE (null_rules);
    fprintf(output_file,"{   0,    0}};\n\n");/* Terminate cref table */
    fprintf(output_file,"int MAXEGO = %d;\n\n",g);
                             /* Number of empties    */
      outline += 4;
}
      Included below in Code Example 2 are examples of the
CREF table and the empty-goto table 60 as generated by the
foregoing Code Example 1.
CODE EXAMPLE 2:
/*CROSS REFERENCE (CREF) TABLE*/
/ *--------------*
int MAXRULES=10;
intMAXTOKENS=83;
struct cref{
   short rule;
   char term;
   }yycref[]={                                       {0, 0},
{6,1},{10,1},{4,1},{0,1},{2,1},{3,1},{4,2},{5,1},{9,1},{9,2},
{0,2},{10,2},{6,2},{7,1},{8,1},{10,3},{9,3},{2,2},{1,0},{0,0}};
/*EMPTY GO-TO TABLE*/
/*----------------*/
   struct EGO{
   int state;
   short rule;
   }yyego[]={                                        {2,9},
   {3,9},{5,1},{10,9},{2,10},{9,2},{6,5},{0,0}};
intMAXEGO=8;
```

Additionally, a modification is made to the generated lexical analyzer code 84 as produced by LEX, the lexical analyzer generator 82 in the embodiment. In this embodiment, LEX includes a module named "lexget.c" which includes code that reads in the input character stream. The lexical analyzer generator 82 typically generates code in which the character input stream is read from a file. In this embodiment of the grammar sensitive editor, "lexget.c" is modified to read the input characters from the edit buffer 42, rather than from an input file.

Below is a portion of C-style code that may be included as in the lexical analyzer source code 84 which reads input from the user edit buffer rather than an input file:

```
CODE EXAMPLE 3: Redirecting the Input Character Stream

/*lexget.c*/
extern FILE *lexin           /*File Pointer              */
extern int lexcharcount;     /*Character Count           */
extern char *clexin;         /*New character pointer     */
extern int editsource;       /*New input source flag     */
lexgetc() {
if(editsource)               /*Mimic file I/O            */
{
if(clexin[lexcharcount]=="[0]")return-1;  /*Use character count to
                                            control edit buffer size*/
else return ((char)clexin[lexcharcount++]);
}
else {lexcharcount ++return(getc(lexin));};
```

In the foregoing Code Example 3, a variable called "lexcharcount" is used to control the size or the number of characters which are analyzed by the grammar sensitive editor 26. In a preferred embodiment of the grammar sensitive editor, the variable "lexcharcount" is used to track the amount of input in the input stream which is processed by the lexical and syntax analyzer 34. There are instances, for example, when inserting code into the middle of an input file already existing in which it is unnecessary to analyze the entire input file. In cases such as these, there may be included in an embodiment a selected mode of operation which only analyzes the input stream up to the current cursor position, for example, as determined when "lexcharcount" equals the current cursor position.

In one embodiment, menu options are used to control the amount of input processing by the lexical and syntax analyzer. For example, a pull-down menu may display the options "analyze to end" and "analyze to cursor". The former option provides for analyzing the user input to the end of the edit buffer, and the latter option provides for analyzing the user input to the cursor position on the display device.

In the previously described embodiment, both the lexical analyzer 50 and the syntax analyzer 52 are produced using the two specific tools, LEX and YACC, previously described and known to those skilled in the art. Typically, the precise tools used to produce a lexical analyzer 50 and syntax analyzer 52 may vary with implementation and operating system of an embodiment. Additionally, just as YACC, the syntax analyzer generator 88 in this particular embodiment, produces a GRT and token name table without any additional modification but yet require additional modifications to correctly produce the empty-goto table 60 and CREF table 62, different methods of producing the syntax analyzer 52 may also require additional or different modifications, in accordance with the syntax analyzer generator 88 chosen for a particular implementation to produce the tables described herein.

Figure 8A:
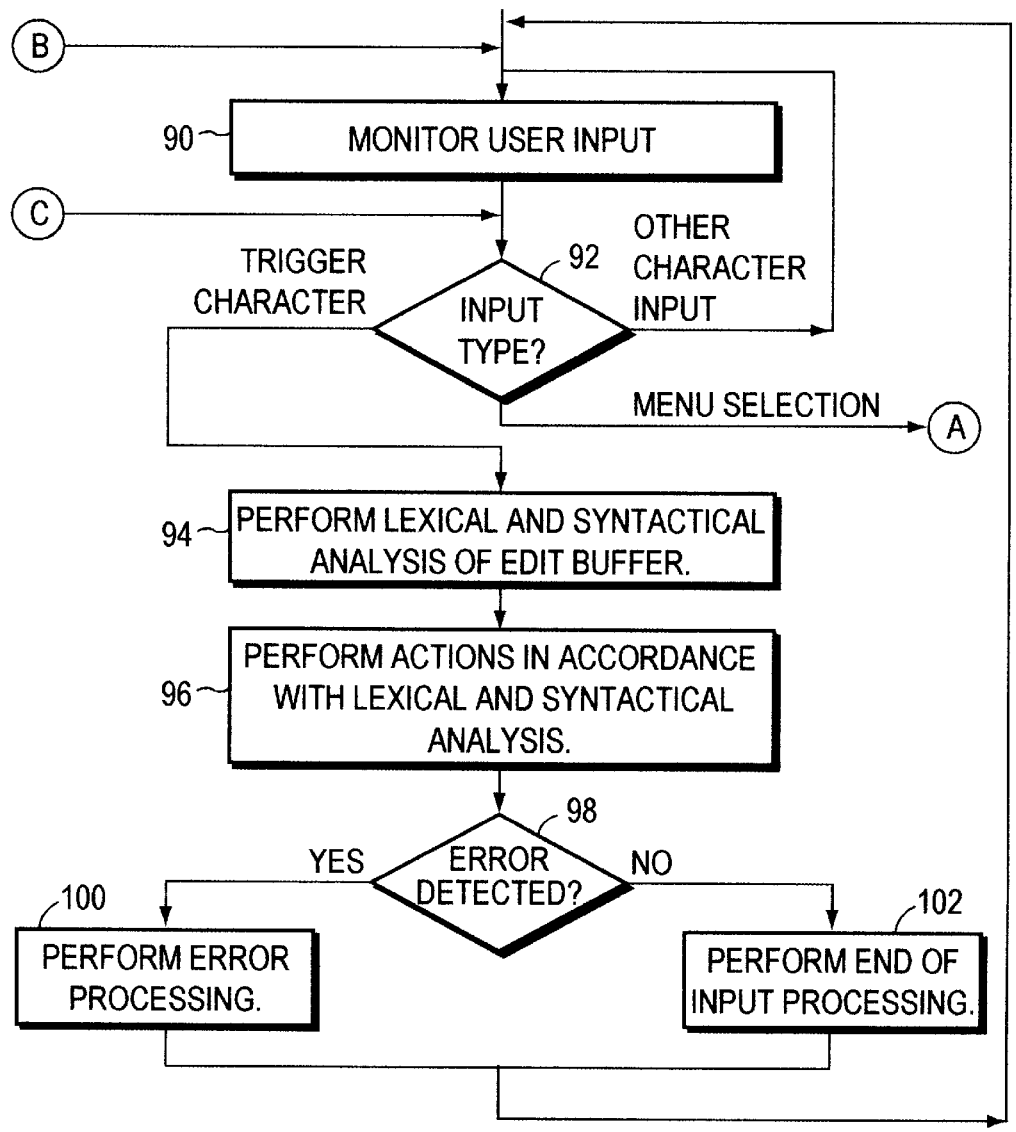
FIG. 8A is a flow chart showing an embodiment of a method for performing program development using a grammar sensitive editor.

Referring now to FIG. 8A, a flow chart showing an embodiment of a method for analyzing user input with a grammar sensitive editor is shown. At step 90, user input 28 is monitored as via an input device included in the I/O interface 20. When input is received, the input type is classified in step 92. Generally, at step 92, user input is determined to be one of four categories: a trigger character, a menu selection, an analysis selection, or another character input. Of the foregoing categories, the first and fourth types are input into the edit buffer via path 28a (of FIG. 2). A character entered into the edit buffer is tested to determine if it is a trigger character. The third type of input—the analysis input selection—is input via an analysis input selection mechanism for directly causing lexical and syntax analysis of a portion of other user input in the edit buffer. The analysis input selection mechanism may be, for example, a button included in graphical user interface of the grammar sensitive editor, or an audio input device which receives and communicates voice commands. Using the audio input device, for example, the lexical and syntax analysis may be triggered by the voice command "analyze". Input of this type proceeds along path 28c (of FIG. 2). Typically, input received via the edit buffer and menu selection are each recognized by different interrupt mechanisms as usually provided by operating system software of the computer system 10.

One category of input received at step 92 is a menu selection, such as when the user selects a particular character or group of characters from a menu displayed. Generally, when displaying a menu from which a selection is made and classified at step 92, the menu contains a list of valid next items from which a selection is made. For example, a list of possible programming language statements may be displayed using a menu form. After displaying the menu form, a user selects, for example, by clicking with a mouse, upon a particular menu item. All other input by the user at step 92 is classified as other character input and control proceeds back to step 90 where user input is again monitored.

Upon detection of a trigger event, lexical and syntactical analysis of the edit buffer is performed, as in step 94. As previously described, a trigger event in the embodiment includes detection of a trigger character or an analysis input selection. In one preferred embodiment with the previously described analysis mode selection, this analysis is performed upon input from the beginning of the edit buffer to the end of the file, or to the current cursor character position. Actions are performed in accordance with the lexical and syntactical analysis, as in step 96. As a result of performing lexical and syntactical analysis, a decision is made as to whether an error is detected at step 98. Upon detection of an error, error processing is performed, as in step 100. If no error is detected, end of input processing is performed as in step 102. Control then proceeds to step 90 where user input is once again monitored.

Figure 8B:
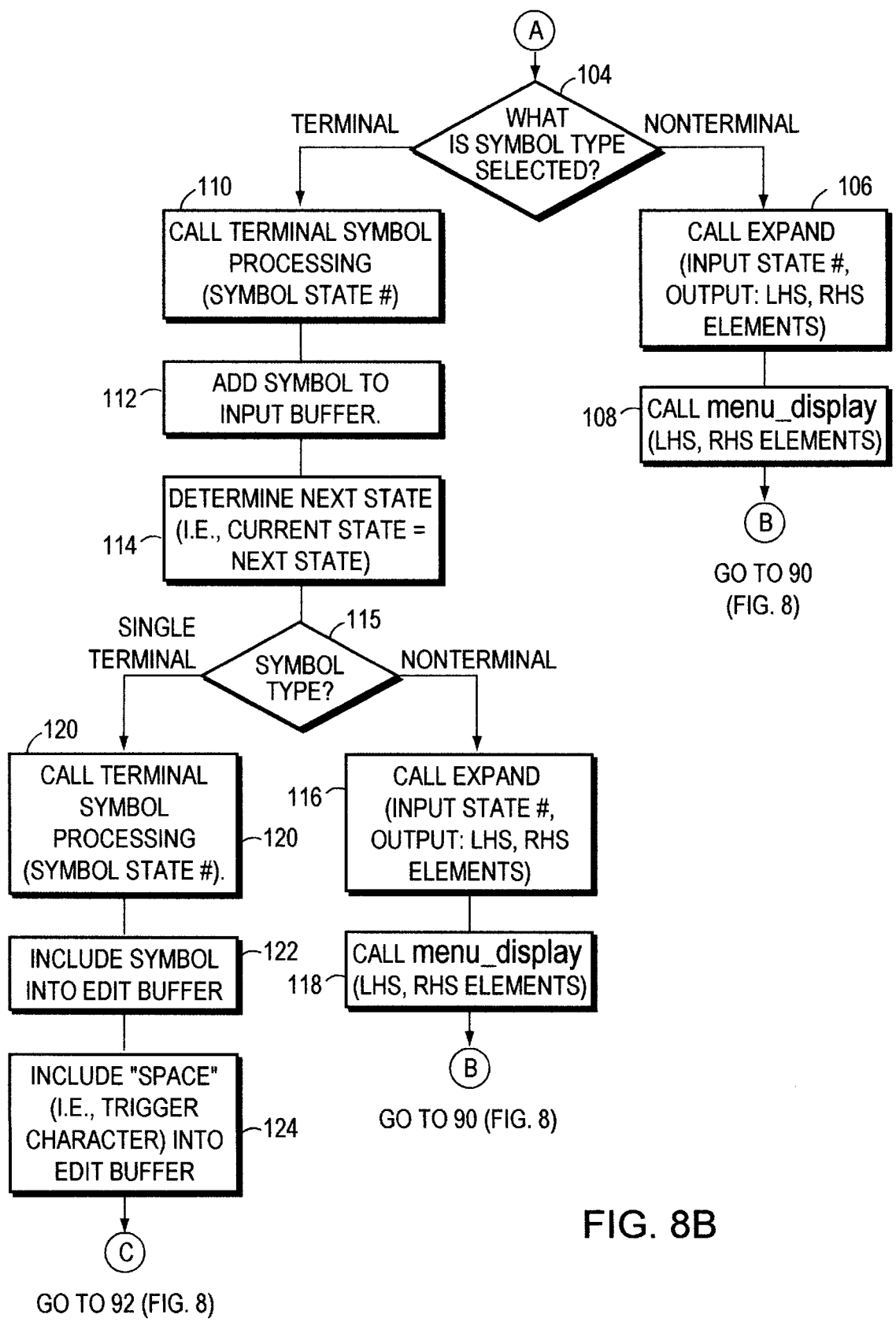
FIG. 8B is a flow chart showing an embodiment of a method of performing menu selection processing.

Referring now to FIG. 8B, a flowchart depicting steps of one embodiment of a method of performing user menu selection processing is shown. Upon detection at step 92 (of FIG. 8A), that a menu selection has been input, displayed is a menu of symbols including terminal and nonterminal symbols. In this embodiment, these symbols are obtained from the GRT in accordance with a previously received error or end-of-file event. The CREF table is used to "look ahead" to the next expected set of grammar symbols. The use of the GRT and CREF table to obtain these symbols is described in more detail below.

In this embodiment, a menu displaying symbols assists a user in performing program development, for example, as in a particular programming language. Typically, the menu displays a set of valid terminal or nonterminal symbols in accordance with analysis performed on the characters processed thus far in the user edit buffer. For example, referring back to the FOR statement syntax as depicted in FIG. 5B, if the "FOR" keyword has already been entered, the menu displayed contains the nonterminal "<FOR-ITERATOR>" at the top of the menu. Additionally displayed below are the terminal symbols "EACH" and "EVERY" from which a selection is made and subsequently included as input into an edit buffer for processing. As such, the user menu processing of FIG. 8B takes appropriate action to display a menu, as just described in conjunction with FIG. 5B.

Upon detection of a menu selection at step 92, control proceeds to step 104 where a decision is made as to what type of symbol has been selected. The symbol is classified as a terminal or a nonterminal symbol. This determination is made, for example, by the syntax analyzer using the token name table 66 previously described.

In one embodiment, an integer value is associated with each terminal and nonterminal symbol. Further all of the terminal symbols, and all of the nonterminal symbols are each associated with a particular consecutive integer range. Thus, an integer comparison of a symbol's integer value to each of the terminal and nonterminal integer ranges is performed to classify the symbol as a terminal or nonterminal symbol. Other mechanisms may be used to classify a symbol as a terminal or a nonterminal dependent upon the tables produced in a particular embodiment.

Upon determining that a selected symbol is a nonterminal, that nonterminal is expanded, as at step 106. In other words, given a particular state number which corresponds to a nonterminal symbol appearing on the LHS of one or more grammar rules, this nonterminal symbol is expanded into one or more corresponding RHS portions of the grammar rules. Returned by "expand", as in step 106 are those first RHS elements of grammar rules having the selected nonterminal symbol as the corresponding LHS side of the grammar rule. Accordingly, these LHS and RHS elements are displayed, as in step 108. Control proceeds to step 90 of FIG. 8A for continued processing of user input, such as another menu selection of a displayed language element. Note that if the expansion yields a single terminal symbol, a preferred implementation may automatically include the single terminal symbol in the edit buffer and resume the analysis process of the input.

As an example of the processing of steps 106 and 108, consider the previous example of FIG. 5B. After the "FOR" keyword has been processed and included in the edit buffer, the next displayed menu includes the keywords "EACH" and "EVERY". Additionally, in one embodiment, the menu displayed includes the nonterminal "<FOR-ITERATOR>". This is the nonterminal which is expanded, as in step 106, and classified, at step 104. An input to "expand" at step 106 is the state number corresponding to the nonterminal "<FOR-ITERATOR>". Returned by "expand" is the LHS symbol corresponding to the nonterminal symbol and additionally the first RHS symbols of each rule in which the "<FOR-ITERATOR>" nonterminal is the corresponding LHS of the rule. In this particular example of FIG. 5B, the keywords "EACH" and "EVERY" are returned as the right-hand side elements from "expand". At step 108 one embodiment of "menu display" also displays the LHS nonterminal symbol at the top of the menu and the corresponding RHS elements "EACH" and "EVERY" below from which a selection may be made for the next appropriate symbol included in the edit buffer.

At step 104 upon classification of the symbol type as a terminal, "terminal symbol processing" is performed, as in step 110. Generally, "terminal symbol processing " as will be described in more detail, performs special processing in accordance with terminal symbol types, such as a variable name requiring additional input. Upon completion of "terminal symbol processing", a terminal symbol is added to the edit buffer as in step 112.

The next analysis state is determined, as in step 114. Typically, step 114 performs a "look ahead" function as to what are the next possible valid states from which a selection may be made. Additionally, there are times when the next possible valid state is only a single state, i.e., only a single terminal. In this instance, appropriate action can be taken by the analyzer since no user interaction is needed.

In one implementation, the next state is determined using information about the current state of processing. Generally, the current state number is used as an index into the CREF table to obtain a pair of indices (Rule #, RHS term #) describing the current state. Using these indices, the next state is determined by resuming processing with a terminal symbol following the current RHS terminal symbol.

In step 114, the next state may be associated with a symbol which is either a single nonterminal or a single terminal. At step 115, a determination is made as to the symbol type which corresponds to the next valid state. Recall in our previous description that each symbol appearing on the RHS of a rule corresponds to a state number. If the symbol appearing on the RHS of a rule is a nonterminal symbol, it can be automatically further expanded. If the symbol appearing on the RHS of the rule is a single terminal symbol, no user interaction is necessary in this particular embodiment because the single terminal can be automatically inserted into the edit buffer and another analysis cycle executed.

At step 115, if a determination is made that the next state corresponds to a nonterminal symbol, it is expanded as in step 116. Subsequently displayed, as in step 118, are the appropriate LHS and RHS elements of the particular nonterminal symbol of the next state. Control proceeds to step 90 of FIG. 8A where the user edit buffer is monitored.

At step 115, if the symbol type is determined to be a single terminal symbol, "terminal symbol processing" is performed, as in step 120. In step 122, the single terminal symbol is simply included into the edit buffer. In this particular embodiment of the grammar sensitive editor, the symbol is simply included into the edit buffer rather than waiting for further user input. At step 124, a space or other trigger character is included in the edit buffer and control proceeds to step 92 to trigger analysis and processing of the look ahead single terminal symbol inserted into the edit buffer.

Figure 9:
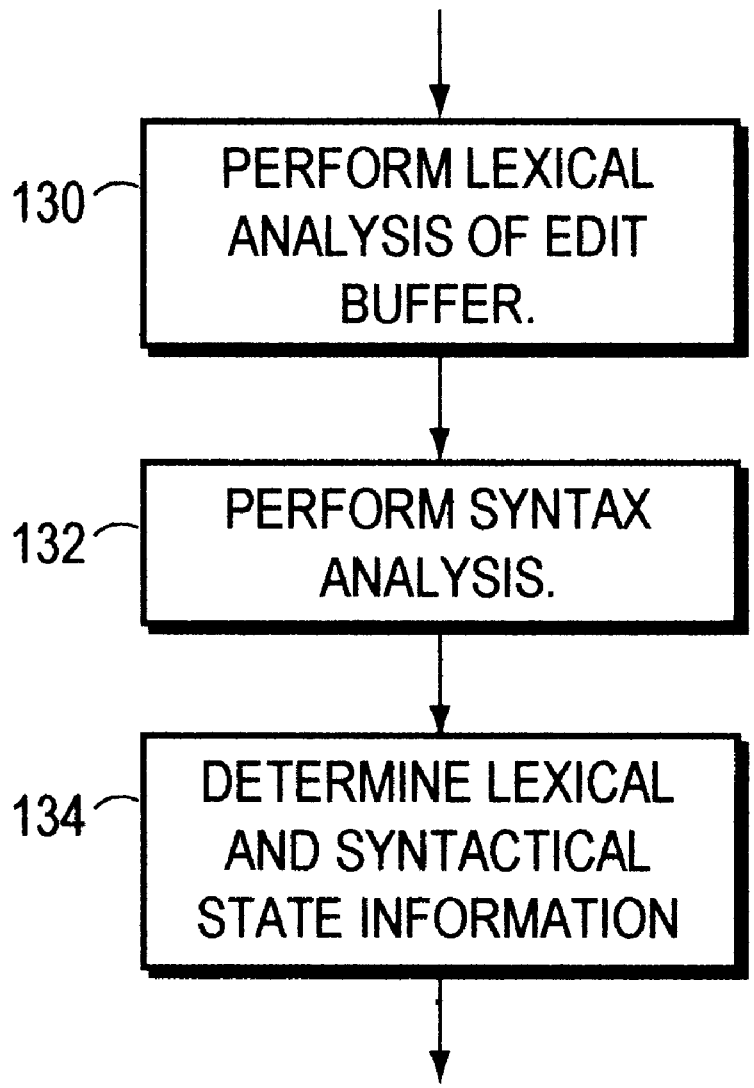
FIG. 9 is a flow chart showing an embodiment of a method of performing lexical and syntactical analysis as used in a method step of FIG. 8A.

Referring now to FIG. 9, shown is a flowchart of an embodiment of a method of performing lexical and syntactical analysis, as in step 94. At step 130, lexical analysis of an edit buffer is performed. As previously described, lexical analysis includes reading the input stream and detecting lexical tokens which are subsequently passed to the syntax analyzer, as in step 132, upon which syntax analysis is performed in accordance with previously specified grammar rules.

In step 134, lexical and syntactical state information is determined. Generally, this includes determining a current grammar state, a previous grammar state, and an error status. The error status may indicate, for example, that an error has occurred in syntax or lexical processing respectively, in steps 130 and 132. Conversely, the error status may also indicate that no error has been detected and the status is merely end of processing of the current input stream.

Figure 10:
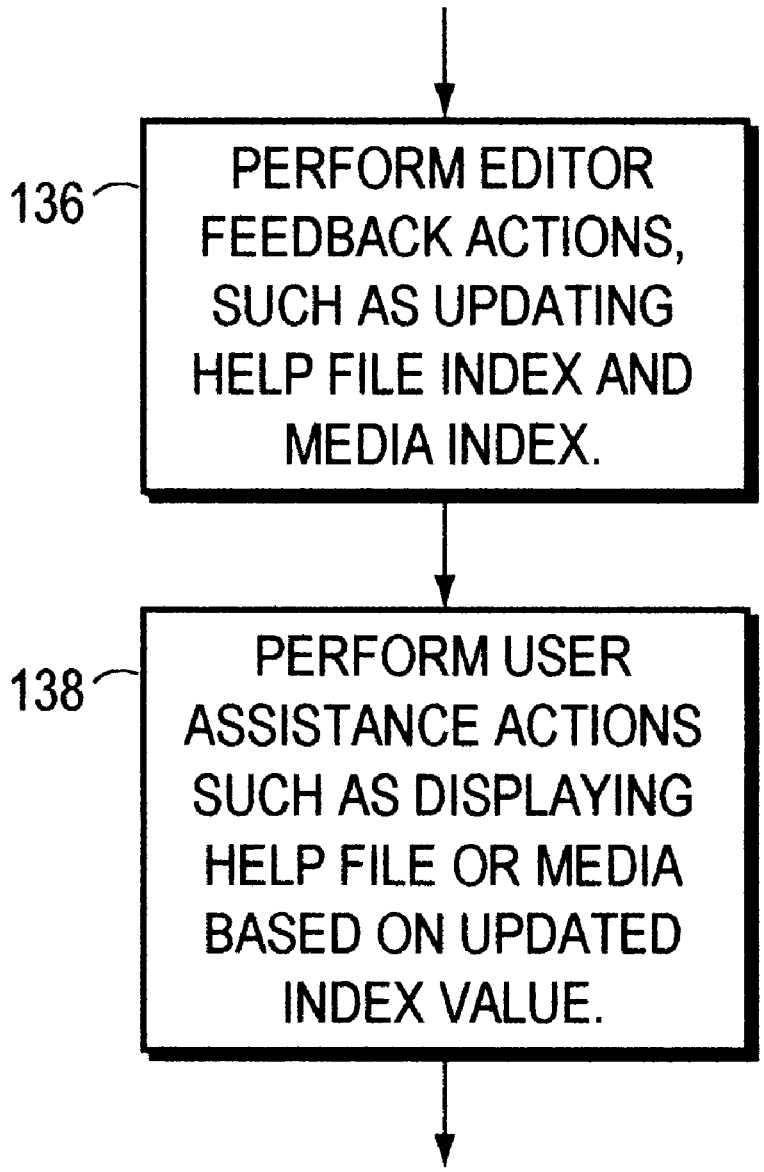
FIG. 10 is a flow chart showing an embodiment of a method of performing lexical and syntactical analysis as shown in the method steps of FIG. 8A.

Referring now to FIG. 10, a flow chart showing an embodiment of a method of performing actions as in step 96 is shown. At step 136 editor feedback actions, such as updating a dynamic help file index and a media index, are performed. For example, at step 136 upon detection of an error status such as an invalid syntax error an index maintained into a help file is updated identifying the appropriate on-line help information corresponding to the statement in which a user syntax error has been detected.

A media index to multimedia assistance and reference services may also be updated. For example, in addition to updating an online help file index, a media index value may be maintained by the grammar sensitive editor 26 identifying sound files residing on disk in the computer system 10 of FIG. 1. User assistance actions are performed, such as displaying the help file or media file, based on the updated index value as performed in step 136. User assistance actions may include, for example, displaying the online help documentation in accordance with the location and statement in which a syntax error has been detected by the syntax analyzer 52. Additionally, a multimedia sound file may playback a previously recorded message or sound. Multimedia devices and related files, such as sound files, may be used in applications and program development by people, for example, who are sight impaired, or desire additional forms of assistance, such as language translation.

Generally, an implementation embodying the principles of the invention may include a wide range of multimedia devices from terminal displays displaying images, such as a portion of a movie or cartoon, to mechanical devices, such as a robot, performing physical actions, such as hand sign language. The particular device used and actions taken may vary with implementation and use of the principles of the invention.

Additionally, detailed multimedia actions can be made in response to the precise state of grammar processing, such as in response to particular keystrokes, to aid someone in learning a new language. For example, a menu may contain certain words in English. For each of these words, corresponding sound files could exist which include a recording of the equivalent word in a different language such as French or Spanish. Upon selection of a given word displayed in English via a menu, the corresponding word in a different language may be played back to the user to assist in learning the pronunciation of various words in a new language.

In this particular embodiment, action routines may be specified in the BNF file input to the syntax analyzer generator which is YACC. YACC provides for the execution of action routines associated with a grammar rule by including a procedure name corresponding to an action routine in the BNF file at the precise point in performing syntax analysis at which the routine is to be invoked. For example, if an action routine is to be invoked upon starting a new grammar rule, such as an action routine that updates a help file index upon recognition of a new FOR statement, the name of the action routine is appropriately placed at the start of a corresponding grammar rule.

The precise technique for specifying and including calls to action routines varies with implementation and method chosen for generating a syntax analyzer.

Figure 11:
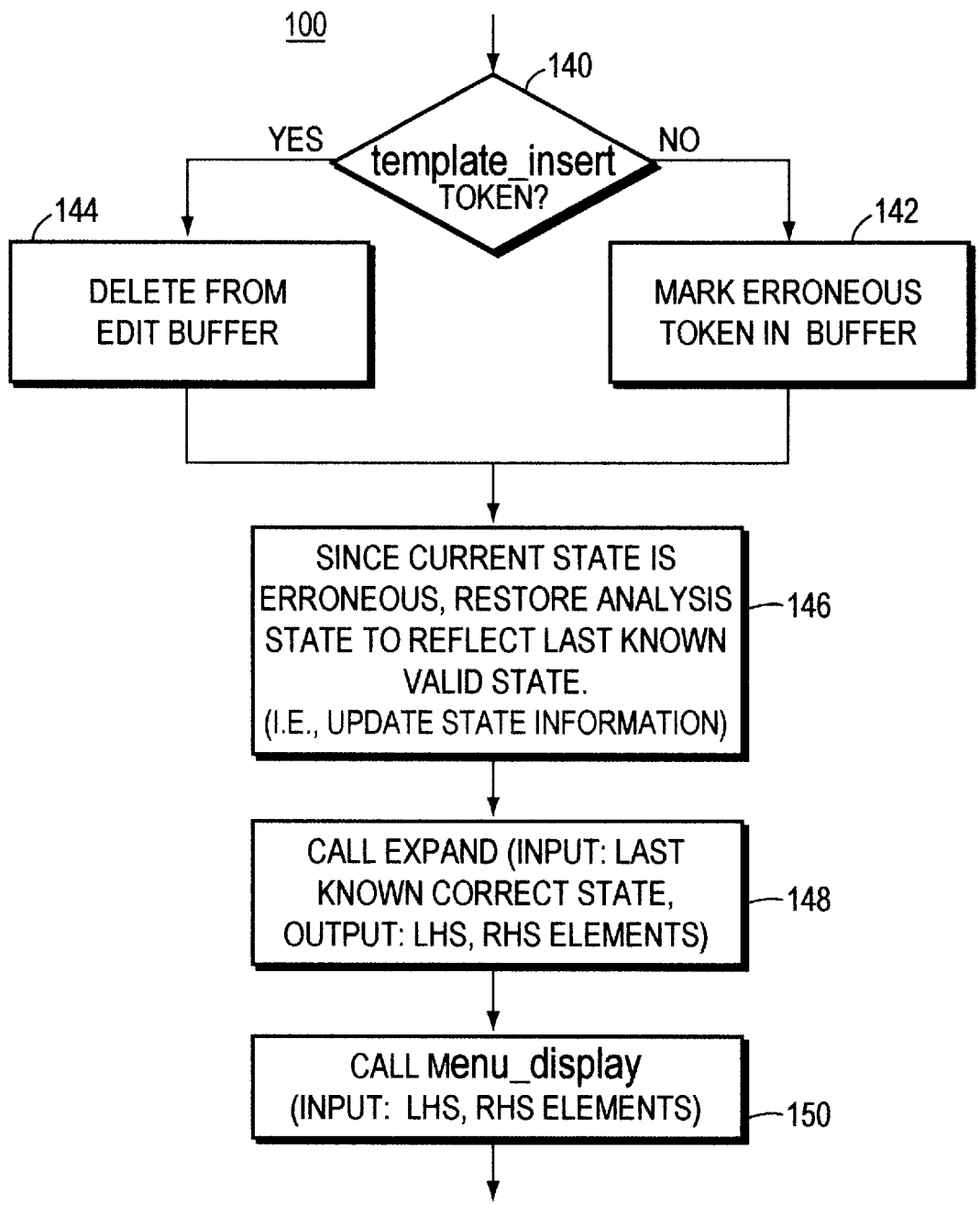
FIG. 11 is a flow chart showing an embodiment of a method of performing error processing in accordance with the method of FIG. 8A.

Referring now to FIG. 11, an embodiment of a method for performing error processing as in step 100 is shown. At step 140 a determination is made as to whether the token causing the error is a "template insert" token. A preferred embodiment includes a predefined "template insert" token which is intended to force a fault during syntactic processing whenever they appear in the user input 28. Note that the "template insert" token is defined as a valid lexical character, and thus correctly passes through lexical processing. However, the "template insert" token is never referenced in a grammar rule thereby always inducing a syntactic fault during syntactic analysis when detected in the input stream. By inserting a "template insert" token into the edit buffer whenever a user supplied value is needed, the analyzer automatically loads the menu with the appropriate valid entry options as is described in the paragraphs that follow.

One typical use of a "template insert" token is inclusion of a data value in a template. A template is simply a pre-existing text segment which is included into the editor to minimize keyboard entry. For example, a programming template may exist for certain routine headers containing a common set of parameters or variable definitions used when editing a file to create a new program. Text of the template is included in the edit buffer rather than entering new text for each occurrence of a common set of definitions. Accordingly, the "template insert" token is used in portions of the template which are not common and require user specified input. The "template insert" token may appear in a template for those portions of the template requiring a user to enter a particular value, such as an identifier name or an integer value. Generally, a "template insert" token is a set of one or more characters in a sequence which is not found in the programming language being analyzed. In other words, a good candidate for a template insert token is a character sequence which is not included in the language definition. One preferred embodiment uses three question marks ("???") since this character sequence is not part of the programming language being processed.

Below is an example template including the template insert token "???". The template may be used to define common routine definitions and the "template insert" token appears in those portions of the template requiring user input:

```
DEFINE ROUTINE ???   (INT ???,    /** First parameter   **/
                      FLOAT ???   /** Second parameter  **/
                      );
```

At step 140, a determination is made as to whether the token causing the error is the predefined "template insert" token. If a determination is made at step 140 that the erroneous token causing the error is the "template insert" token, the characters in the user input stream corresponding to the current "template insert" token are deleted from the edit buffer, as in step 144. If at step 140 a determination is made that the token is not the "template insert" token, control proceeds to step 142 where the erroneous token in the edit buffer causing the error state within the analysis is marked, such as by highlighting or setting out in another manner the erroneous token in the edit buffer so that it is highly visible and identifiable by a user. In addition to highlighting the error token, one preferred implementation positions the input cursor in a special cursor style at the characters causing the error.

The analysis state is rolled back to the last known valid state as in step 146. It should be noted that the precise state to which the analysis phase returns upon detection of an error as in step 146, as well as the precise method used to achieve this step is highly dependent upon implementation. In this particular embodiment, the parser of the syntax analyzer maintains a stack in which the execution of rule states are placed. The stack is simply popped to retrieve the state of the rule which led up to the error. Thus, the analysis phase can be returned to a previous state by simply popping the stack, as known to those skilled in the art. The state to which processing is to returned in step 146 is dependent upon the technique used to perform syntax analysis. The syntax analyzer 52 in this particular embodiment uses a technique commonly known as shift-reduce parsing. Thus, it is the syntax analyzer which maintains the state which caused the error (or the state of the template insert token) and additionally determines to which state the analysis processing is restored.

Generally, the technique employed is to identify the erroneous state, and display other tokens or symbols which should be used or selected from in place of the highlighted or marked token which is known to be erroneous. This is accomplished by executing step 148 in which a known correct state is expanded. In this particular embodiment, "expand" is invoked which, for a given state number of syntax analysis, returns the correct LHS or nonterminal symbol and corresponding first RHS rule elements. As in step 150, these items are displayed to the user for example as in the form of a menu.

Figure 12:
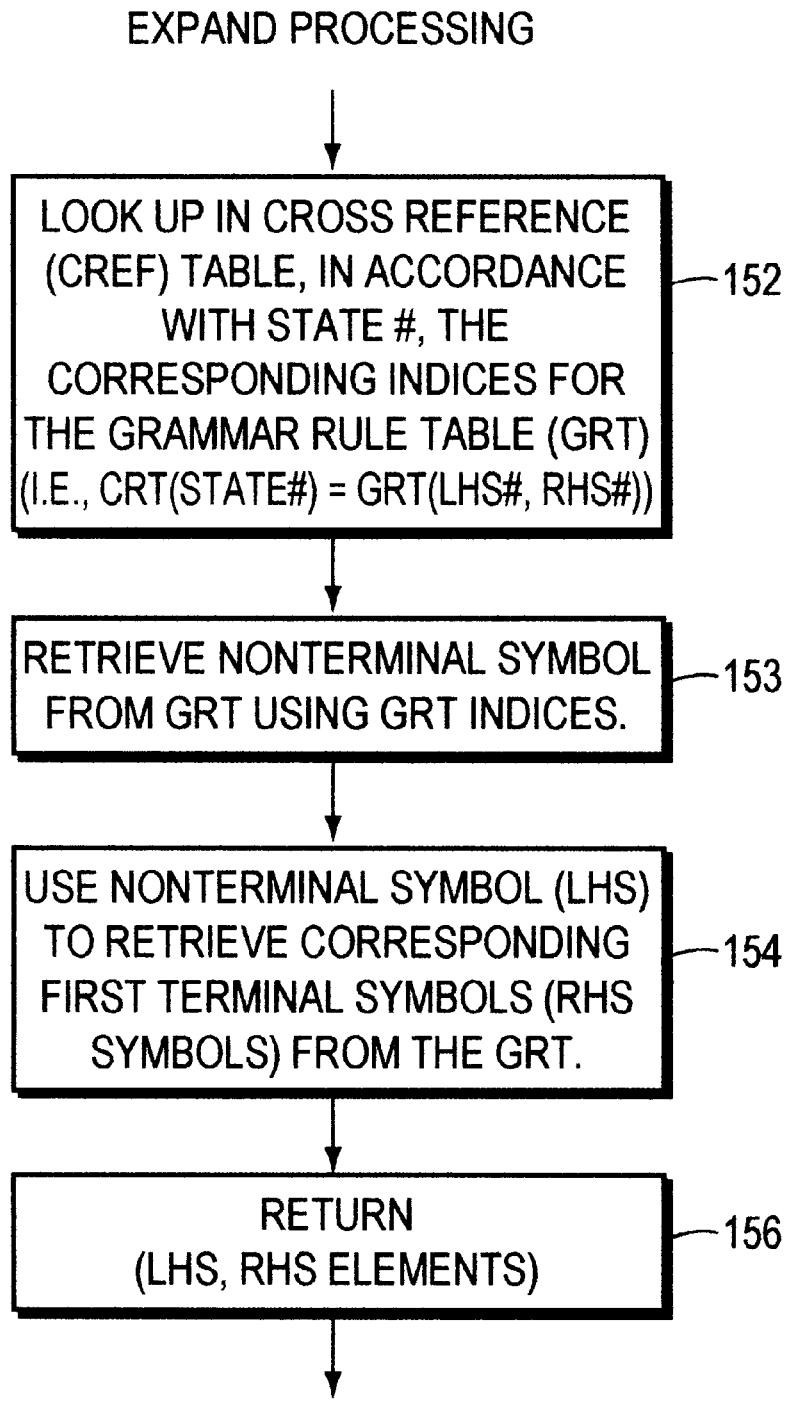
FIG. 12 is a block diagram of an embodiment of a method for expanding a nonterminal symbol.

Referring now to FIG. 12, an embodiment of a method for expanding a nonterminal symbol given its corresponding state number is shown. The method depicted by the steps of FIG. 12 is an embodiment of "expand", as invoked in steps 116 and 148 previously described in conjunction with other figures. It should be noted that this embodiment of "expand" uses the previously described CREF table 62 and GRT 64 in combination to return the appropriate symbols needed to display the next menu.

In step 152, given a state number corresponding to a particular nonterminal symbol located in a grammar rule, a look up is performed using the CREF table. Retrieved from the CREF table are the corresponding indices for the GRT. Recall that a state is associated with a particular point in processing within a grammar rule. In this particular instance, the symbol looked up in the CREF table is known to be a nonterminal symbol thus appearing on the LHS of at least one grammar rule. This look up in the CREF table produces a pair of indices (denoted Rule #, RHS element of Rule#). Using these as indices into the GRT, a nonterminal symbol corresponding to the input state number is retrieved.

Using this nonterminal symbol, the GRT is searched in an effort to expand the nonterminal symbol in accordance with rules in the GRT 64. In this particular embodiment the GRT is structured such that the LHS symbol containing the nonterminal appear to the left of each line of the grammar rule as previously discussed and seen in conjunction with FIG. 5B and other code examples. Additionally, within the GRT of this embodiment, all grammar rules having a common LHS appear in a single contiguous block. Thus, when performing a sequential search of the GRT, once the LHS symbol is found in a rule, all first RHS symbols are found by examining each rule until the first new LHS nonterminal is determined. In other words, the nonterminal is expanded by locating each line of the GRT which matches our LHS nonterminal symbol in order to identify and return those first right hand side symbols of the corresponding rules.

The foregoing generally describes the process of expanding a nonterminal symbol. Additional details may vary with implementation. For example, in one implementation using the tables previously described as being associated with YACC, names of action routines are specified in the GRT which is searched during expansion of a nonterminal symbol. The names of the action routines are prefixed with a "$". Thus, if a RHS argument is prefixed by a "$", the RHS argument is ignored during expansion since it signifies an action routine.

This concept of expanding a nonterminal is generally is illustrated using the following text:

```
1      <M>   :   <A>CC
2      <A>   :   b<B>
3      <A>   :   c<C>
```

In the foregoing text, two grammar rules are identified as included in the GRT. Input to the "expand" routine is a state number which corresponds to the nonterminal symbol "<A>" as indicated in line 1 of the above code insert. Given a state number corresponding to this nonterminal symbol "<A>" as it appears in grammar rule 1 above, this state number is used as an index into the CREF table. Retrieved from the CREF table are corresponding indices into the GRT identifying grammar rule 1 and RHS element 1. These indices are a product of executing step 152. In step 153, the nonterminal symbol "<A>" is retrieved from rule 1 RHS symbol position 1 by performing a look up into the GRT as at step 153. In step 154, this nonterminal symbol "<A>" is used to retrieve corresponding first RHS symbols from the GRT. In this particular example, the nonterminal symbol "<A>" is used to locate rules 2 and 3 since this nonterminal appears on the LHS of these rules. Correspondingly, the RHS elements "b" and "c" are retrieved and returned in step 156 as the next items to be displayed on the menu.

Figure 13:
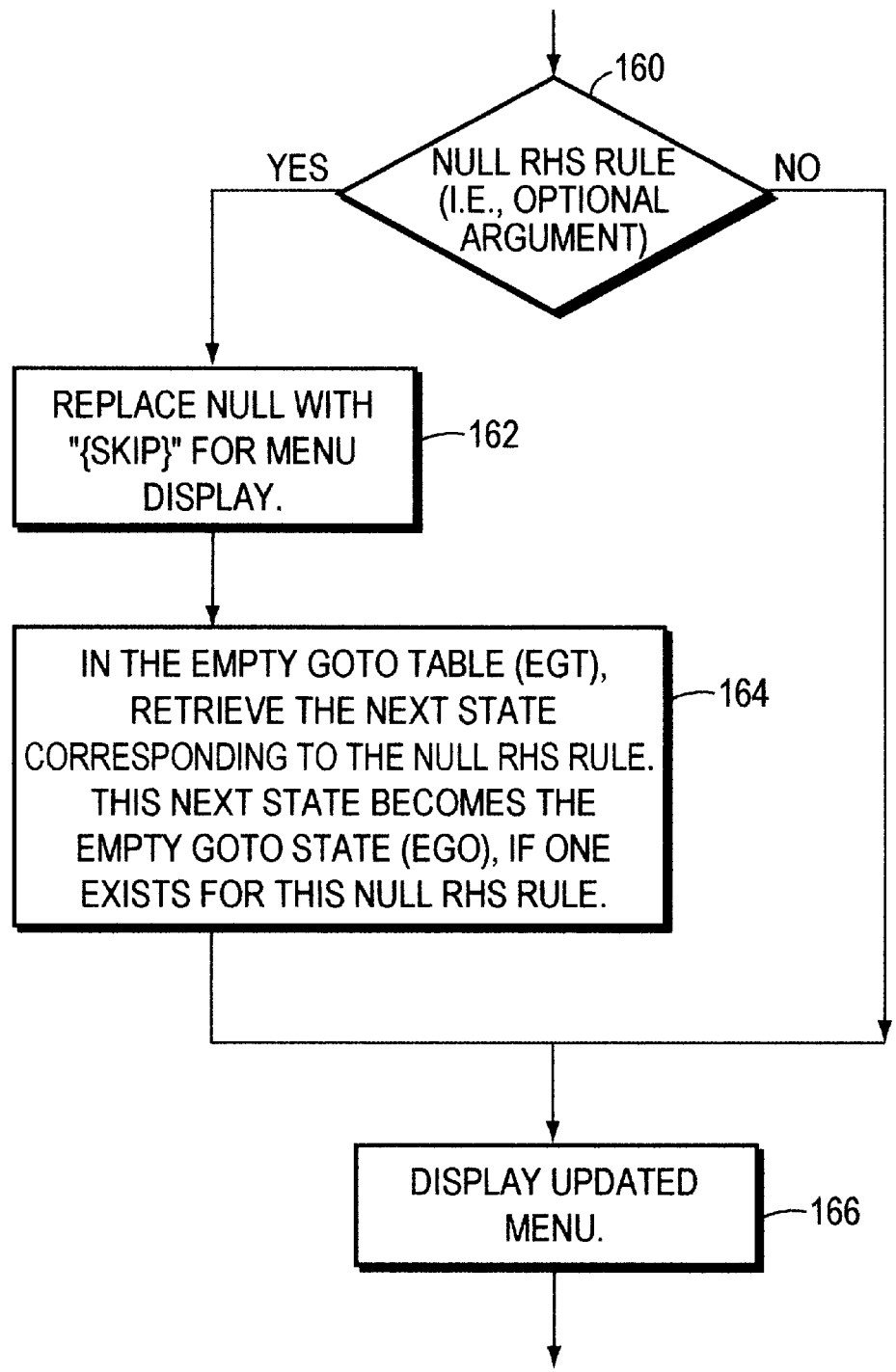
FIG. 13 is block diagram of an embodiment of a method for performing menu display processing.

Referring now to FIG. 13 is a flow chart showing an embodiment of a method for displaying a menu to the user as with a menu display in this particular embodiment Generally, "menu display" processing as depicted in FIG. 13 displays the menu and additionally handles any updated processing or special processing required for characters returned as RHS or LHS symbols to be displayed.

One special type of argument or symbol to be displayed is that associated with the "null rule" or "empty RHS rule"

previously described in conjunction with optional arguments. A determination is made at step 60 as to whether one of the RHS elements to be displayed on the menu is a null rule. In this particular embodiment, a null rule indicates an optional argument.

Upon detecting at step 160 that the current state number being expanded contains an optional argument or expands to a null or empty rule, control proceeds to step 162 in which the null character is replaced with the character sequence "{skip}" for menu display. Another indication of an optional argument may be used for menu display rather than this notation. Generally, the purpose is to display a unique character sequence indicating that this nonterminal being displayed at the menu is an optional argument. Note that in one preferred implementation, replacing the null character with a "{skip}" (indicating an optional argument) is alternatively performed during expanding process steps of FIG. 12.

Control then proceeds to step 164 in which the empty-goto table is searched for the current state number to retrieve a corresponding entry representing the next analysis state following the optional argument. This next analysis state retrieved from the empty-goto table is saved, such as in an area in memory, and is hereinafter referred to as the empty-goto state (EGO). Functionally the next analysis state represents the state immediately following the current state of an optional language element such that if the optional language element is skipped, the analysis phase proceeds with the next analysis state following the current state. An updated menu is displayed, as in step 166. If a determination is made at step 160 that the current state number being expanded does not correspond to an optional nonterminal, control directly proceeds to step 166 with no special adjustments made to the menu. The EGO state is set to zero, or some other indicator that there is no valid empty-goto state being identified by the EGO state indicator (or programming variable).

The above processing for menu displaying and the special processing for an optional argument is best illustrated with an example using the following text.

| 1 | <M> | : | b<A>CC |
| 2 | <A> | : | <B>b |
| 3 | <A> | : | ; |

In this example, our current state of processing is the state which represents the nonterminal symbol "<A>" appearing on the RHS of rule 1. When executing menu display processing to display the next set of symbols, the RHS symbols are the nonterminal "<B>" (in rule 2) and " " ("null", appearing as an empty RHS rule 3), appearing as the first RHS symbols in the above example. At step 160 it is determined that the nonterminal symbol "<A>" appearing in rule 1 expands in accordance with rules 2 and 3 to the nonterminal symbol "<B>" and null, as the first RHS symbols. The null RHS of Rule 3 encountered when expanding the nonterminal "<A>" of rule 1 indicates that the occurrence of "<A>" is an optional argument. In one preferred embodiment, the nonterminal symbol "<A>" is displayed at the top of the menu. Displayed below the nonterminal "<A>" are "<B>" and "{skip}", indicating that the "<A>" is optional. In step 164 the empty-goto table is used to retrieve the next state corresponding to the first terminal symbol "C" appearing in rule 1 as the third RHS argument such that if "<A>" is optionally skipped by selecting "{skip}" from the displayed menu, analysis may resume beginning with the state associated with terminal "C" in rule 1.

In this particular embodiment, the source code for the syntax analyzer 90 includes support for the empty-goto operation using the empty-goto table 60. This can be accomplished using several techniques. One technique modifies the syntax analyzer generator 88, in this instance YACC, to generate modified code including the necessary support. A second alternative is to modify YACC's output, the syntax analyzer source code 90. The choice as to which alternative is used is dependent upon the particular implementation. If several versions of syntax analyzer source code are going to be generated, it is generally preferred to modify YACC the syntax analyzer generator to generate source code including support for using the empty-goto table and its associated operation. In either case, the source code generated by the syntax analyzer generator should include functionality as appearing in the following example portion of C-style code:

---
CODE EXAMPLE 4
---

```
/*Parser Routine (yyparse) */
intyyparse( )                          /*Much code omitted for
    :                                     clarity*/
    :
{                                :
/*IF WE CAN'T SHIFT OR REDUCE, HANDLE THE FAULT*/
if(!ego)                               /*On first occurrence.          */
{                                      /*. . . locate the empty rule. . .  */
    for (yyn = 0; yyn < MAXEGO;yyn++)
    if(yyego[yyn].state = yystate)
    {
        ego = yyego[yyn].rule; /*. . . and stash it away           */
        break;
    };
    yyerror(vystate);               /*Call custom fault handler      */
    YYABORT;                        /*No need to attempt recovery    */
}
else                                /*On second occurrence . .       */
}
    yyn = (int)ego.    /*. . . force Empty-Goto operation*/
    ego = 0
    goto erotic;
};
```

Note that if the alternative selected is to modify the syntax analyzer generator (YACC), it can easily be accomplished by making code modifications to YACC's "skeleton.c" module to generate the foregoing source code extensions.

In the foregoing description regarding FIG. 13 to display the menu, a preferred embodiment provides a visible distinction between terminal symbols and nonterminal symbols displayed to indicate when expansion of a nonterminal symbol is expected and, in contrast, to indicate for a terminal symbol that no further expansion occurs. For example, in a preferred embodiment the nonterminal symbols are distinguished from the terminal symbols by highlighting or bolding. The nonterminal symbols displayed to the user at the top of the menu typically indicate a goal of one or more subsequent editing operations. Further, any nonterminal symbols appearing as selections may also be highlighted or bold. One skilled in the art knows that other techniques, such as choosing all uppercase or all lowercase for symbols, or using color differentiation, also distinguishes terminal symbols from nonterminal symbols as displayed for selection.

Figure 14:
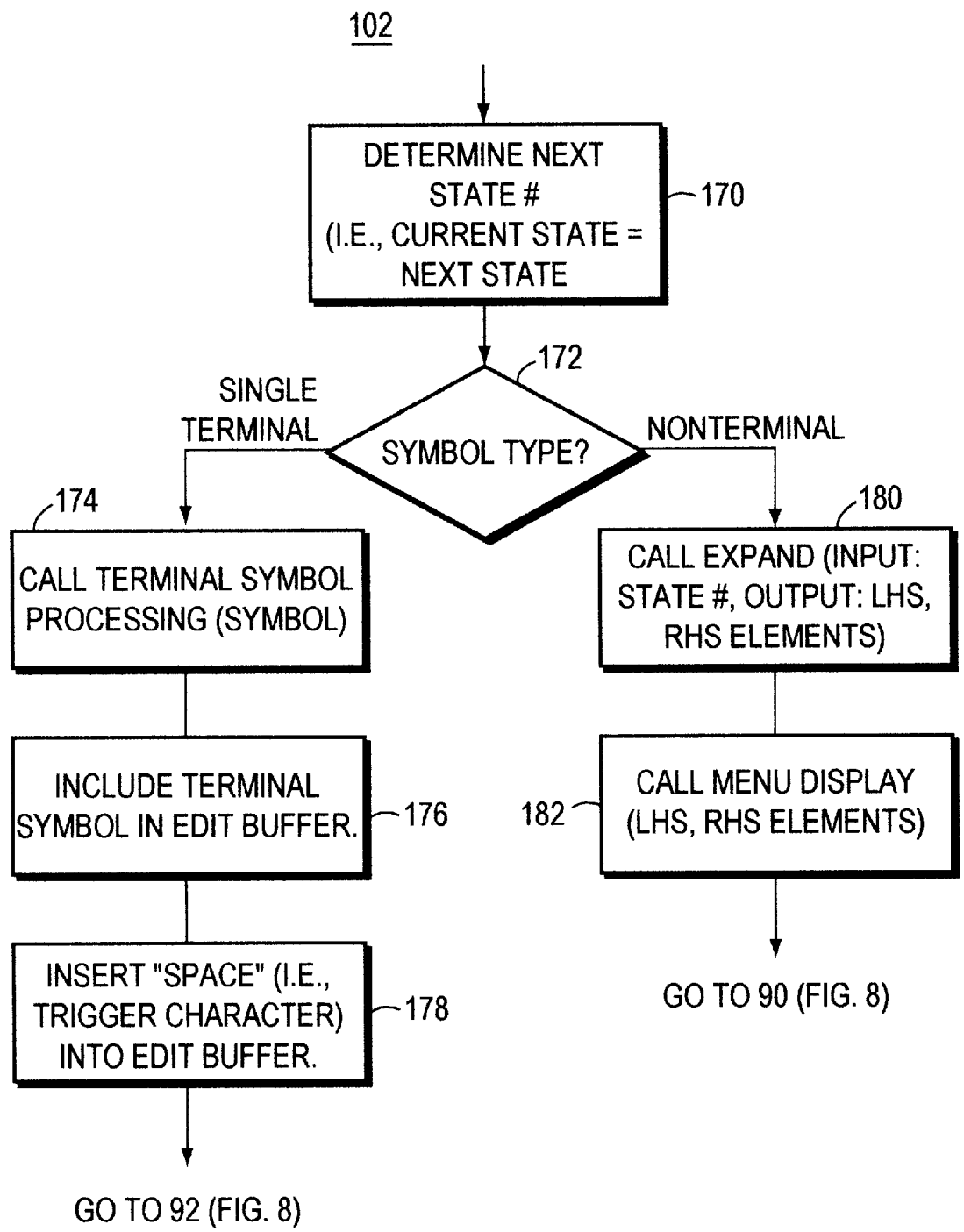
FIG. 14 is a block diagram of an embodiment of a method for performing end of input processing.

Referring now to FIG. 14, an embodiment of a method of performing end of input processing as in step 102 is shown. At step 170 the next state is determined. At step 172 a determination is made as to what type of symbol is represented by the new state. If a determination is made that the new state corresponds to a single terminal symbol, control proceeds to step 174 to perform "terminal symbol processing". The terminal symbol is automatically included in the edit buffer as in step 176 followed by a trigger character such as a space in step 178. Control proceeds to step 92 of FIG. 8A.

If a determination is made at 172 that the symbol type is a nonterminal symbol, control proceeds to step 180 where this nonterminal symbol is expanded such as by calling the expand routine as previously described in conjunction with FIG. 12. Returned are the various RHS elements to be displayed in the menu, as in step 182. Control proceeds to step 90 of FIG. 8A for further processing.

As previously described, steps 174 through 178 perform "look ahead processing" which a preferred embodiment includes for processing a single terminal symbol in which no user choice or selection is involved. The single terminal is assumed to be selected since there is only one element from which to choose.

Note that the manner in which end-of-file (end of input stream) character is indicated may vary with implementation. For example, using YACC, end-of-file is indicated by a zero value of a variable (yychar) which indicates a current processing state.

Figure 15:
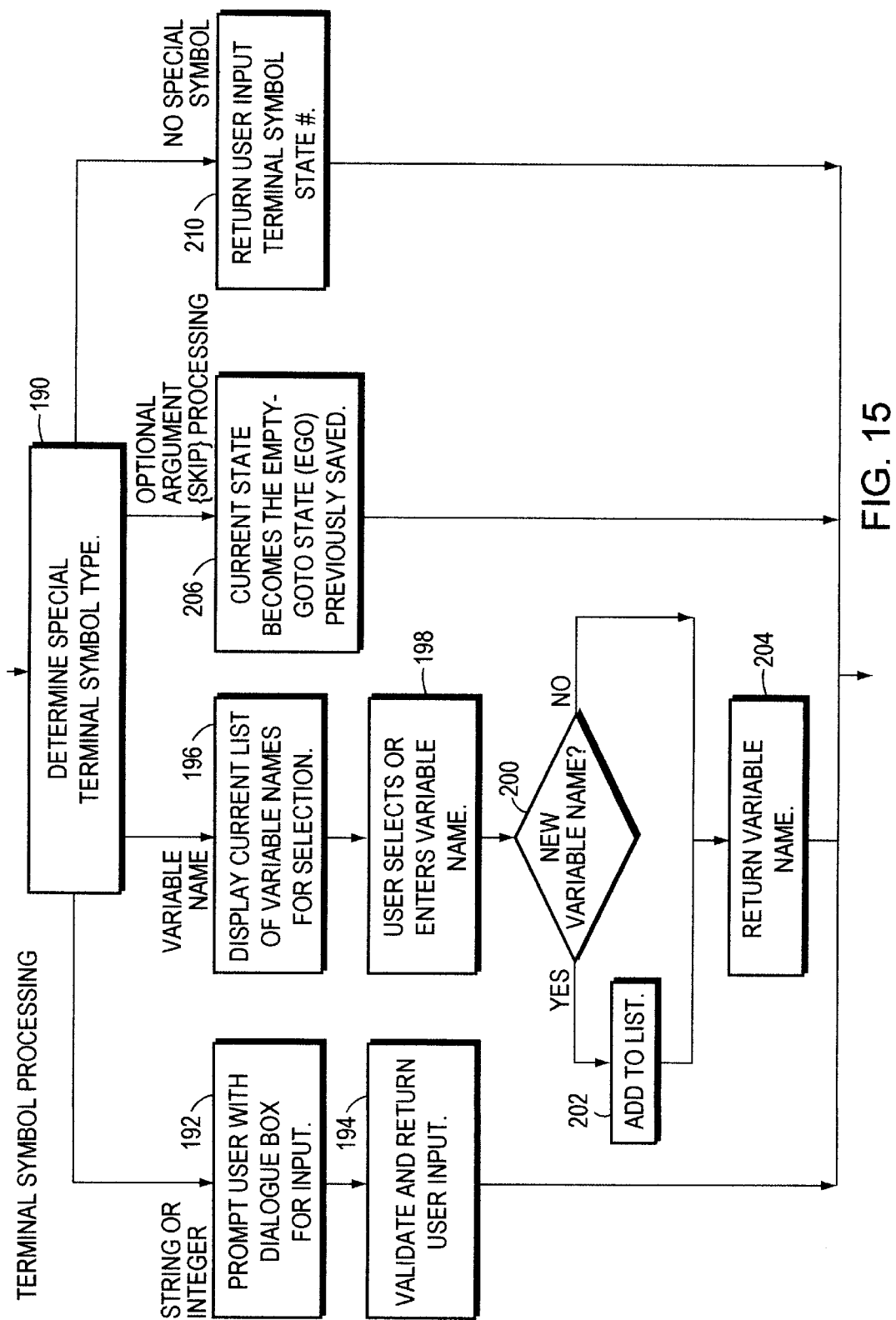
FIG. 15 is a block diagram of an embodiment of a method for performing terminal symbol processing.

Referring now to FIG. 15, an embodiment of a method for performing terminal symbol processing is shown. Generally, terminal symbol processing handles additional processing of special terminal symbols in accordance with the programming language or other inputs. The precise types of terminal symbol processing vary with programming language or other development language for which the grammar sensitive editor 26 is being used.

At step 190 a determination is made as to what special type of symbol, if any, the current symbol corresponds. In this particular embodiment for the programming language being developed, the terminal symbol type may correspond to a string or integer, a variable name, an optional argument, or no special symbol at all. If a determination is made at step 190 that a menu selection correspond to the terminal symbol of type string or integer, control proceeds to step 192 where a dialog box or other type of inquiry function is displayed to receive user input. At step 194 user input is received, validated, and returned to the calling process.

If at step 190 a determination is made that the special terminal symbol type corresponds to a variable name, such as an identifier, control proceeds to step 196. A list of variable names for selection is displayed to the user. At step 198, selection of a variable name either is made from an existing name list, or alternatively entering a new name not on the name list. At step 200, a determination is made as to whether the variable name is a new variable name, or one of the currently defined variable names. If it is a new variable name, control proceeds to step 202 where the name is added to an ongoing list of variables available for future selection. Control then proceeds to step 204 where the variable name is returned to the calling process.

At step 190 if a determination is made that the special terminal symbol is an optional argument which the user has selected to optionally skip, as by selecting "{skip}" from a displayed menu, processing resumes by restoring the syntax analyzer to the analysis state following the optional argument. This is done in step 206 by rewinding the current state to become the previously saved EGO state.

In one embodiment using YACC with shift-reduce parsing, when an optional argument is skipped, as by selecting {skip}, the parser's reduce routine (i.e., in this case, yyreduce) is called with the previously saved EGO state as an argument to effectively place the parser into a processing state in which the current grammar rule has completed and the parser continues processing in a state in accordance with the specified EGO state.

If a determination is made at step 190 that no special terminal symbol is detected, no special processing is done at step 210. The routine returns to the calling routine. In a preferred embodiment, the calling routine may subseguently insert the selected terminal into the edit buffer and start another analysis cycle.

It should be noted in the foregoing description that the grammar rules used in the GRT 64 include terminal and nonterminal symbols directly determined in accordance with the BNF file 86 used as an input to the syntax analyzer generator 88. Thus, in this particular embodiment, it is important to note that in order to be descriptive and helpful to the user, nonterminal symbols and terminal symbols defined originally in the BNF file 86 should be descriptive since it is these symbols which are directly displayed to the user in the menu for selection. Additionally, in the previously described embodiment, an assumption has been made that a grammar rule does not expand to a single nonterminal symbol. Those skilled in the art can easily modify the foregoing methods and systems described for any alternatives regarding the grammar rules as may appear in alternative embodiments of the invention.

One preferred embodiment of the invention using YACC as the syntax analyzer generator transfers control to a fault handler regardless of whether error processing is performed, as in step 100 of FIG. 8A, or whether an end of file is detected, as in step 102. In other words referring back to FIG. 8A, in this particular embodiment, the fault handler is called in response to detecting both erroneous and non-erroneous conditions. YACC provides a code stub for creating a customized fault handler called "yyfault". In the instant case, the fault handler indicates the character position of a fault and initiates the loading of a grammar menu with valid choices. The version of the custom fault handler in this embodiment first determines if the fault was indeed a response to encountering an end of file such as the decision made at step 98. This is done by checking for zero value in the parser input character code within YACC. On end of file any previous error indications are reset or cleared in addition to any other state information being reset. The grammar menu is reloaded with symbols based on the next state. If, as in step 98, an error is detected such as passing control to step 100 of FIG. 8A, the start and end character position of the last token or language construct which was parsed causing the error is determined. The starting character position is calculated and the appropriate characters within the edit buffer are marked or highlighted.

The following is a portion of a C-style code example as may be included in a custom fault handler in a preferred embodiment of the invention.

CODE EXAMPLE 5

```
/* Calculates position of token and calls MarkFault( ) to highlight */
extern void MarkFault (int,int,int);   /* Signal line, char pos in error   */
extern void LoadOptions(int);          /* Option Menu Loader               */
void yyerror(int state)
{
int tmark;
if(state = −1) return;                 /* Stack Overflow */
−−1excharcount;                        /* Compensate for trailing space */
if (yychar)                            /* If not EOF, locate fault         */
{
                                       /* Calculate position and size      */
    tmark = ((strncmp((char *)&11buf,"???",3)) ==0) ? 1: 0;
    MarkFault(tmark,lexcharcount - ((char) llend - (char) &
    11buf[0]),1excharcount);
}
```

-continued

CODE EXAMPLE 5

```
else MarkFault (0,0,0);      /* Reset Fault indication.    */
Loadoptions(state);          /* Pass State to grammar menu */
lexcharcount = 0;            /* Reset character counter    */
}
```

A preferred embodiment of the GRT may include one or more grammar rules in which the right hand side is a single nonterminal symbol. In this instance, some modifications may be made to the foregoing description including various optimizations. For example, the foregoing description may be modified to automatically select a nonterminal symbol, as in the foregoing description for a single terminal symbol. In this instance, instead of inserting the nonterminal symbol into the edit buffer as with a single terminal symbol, its nonterminal status would invoke another level of grammar rule expansion. However, it should be noted that this automatic expansion may result in infinite recursive expansion of nonterminal symbols.

The foregoing description affords a flexible and efficient way of implementing a grammar sensitive editor as used in various applications such as program development in which a source file is created for a particular programming language. The foregoing technique can easily be tuned for a particular implementation in accordance with the variety of applications and uses from learning a particular commercially available programming language to using the foregoing technique as an aid for helping the hearing impaired, learning a new spoken language (such as French or Spanish), grading papers (such as ones containing fill in the blanks or multiple choice), or filling out and validating a structured form (such as a tax form).

Techniques used in the previously described embodiments generally improve programmer productivity and aid in reducing a learning curve often encountered in performing various tasks such as writing a program in a new or infrequently used programming language.

Having described preferred embodiments of the invention, it will now become apparent to those of skill in the art that other embodiments incorporating its concepts may be provided. It is felt, therefore, that this invention should not be limited to the disclosed embodiments, but rather should be limited only by the scope of the appended claims.

What is claimed is:

1. A method of performing grammar sensitive editing of user input represented by one or more tokens, said method comprising the steps of:

detecting a trigger event;

performing, in response to detection of said trigger event, lexical and syntactical analysis of said user input;

transmitting, responsive to detection of an erroneous token by said performing step, one or more valid language options for use in place of said erroneous token; and transmitting, responsive to detection of no erroneous tokens by said performing step, one or more subsequent language options;

wherein the step of transmitting one or more language options and the step of transmitting one or more subsequent language options include transmitting a menu of one or more symbols based upon grammar rules defining syntax rules of input language, said menu including one or more first right hand side symbols corresponding to an expanded non-terminal symbol in accordance with said grammar rules defining syntax rules of said input language.

2. The method of claim 1 further including the step of:
   monitoring said user input for an input selection of a transmitted language option.

3. The method of claim 1 further including the step of:
   updating, in response to said performing step, a media index by invoking an action routine.

4. The method of claim 3, wherein said media index is associated with a help file used to transmit help information to a user upon detection of said erroneous token, and the method further including the step of:
   marking said erroneous token in said user input upon detection of said erroneous token.

5. The method of claim 3, wherein said media index is associated with a multimedia device which operates in response to said performing step.

6. The method of claim 5 further including the step of:
   operating said multimedia device in response to said performing step wherein said multimedia device has a corresponding multimedia data type describing a type of data associated with the multimedia device, said multimedia data type being one of the following: an image data type in which one or more images are transmitted responsive to said performing step, and a physical action data type in which one or more physical actions are taken by a mechanical device responsive to said performing step.

7. The method of claim 3 further including the step of:
   playing, in response to said performing step, a recorded sound associated with said media index.

8. The method of claim 7, wherein said recorded sound is one of the following: instructions used upon detection of said erroneous token, a message played in response to detecting no erroneous tokens, a first language recording played in response to user input of a second language.

9. The method of claim 1 further including the step of invoking, upon detection of said erroneous token, a fault handler to perform error processing, said error processing including the following steps:
   determining if said erroneous token is a template-insert token, said template-insert token being a predefined sequence of one or more characters used to indicate that user-specific input is required; and
   upon determining that said erroneous token is said template-insert token, removing said template-insert token from said user input.

10. The method of claim 9 further including the step of:
    transmitting template data responsive to determining that said erroneous token is said template-insert token.

11. The method of claim 9, wherein said fault handler restores an analysis state to a previous state, said analysis state being associated with said step of performing lexical and syntactical analysis in accordance with said grammar rules, said analysis state corresponding to one of said grammar rules and a symbol included in said one grammar rule representing a state in a finite state machine used in said performing step in lexical and syntactical analysis, said previous state being associated with a symbol included in said user input which said performing step has determined to be a valid token of said input language.

12. The method of claim 11, wherein said syntactical analysis of said performing step includes the step of:
    transitioning between states of said finite state machine in response to said user input in accordance with predefined grammar rules in a grammar rule table representing syntax of an input language, each of said predefined grammar rules including a left-hand side nonterminal symbol associated with one or more right-hand side symbols, each of said states being associated with one of said predefined grammar rules and a right-hand side symbol, and said language options transmitted in response to detecting an erroneous token correspond to one or more valid states subsequent to said previous state of said finite state machine, said one or more valid states representing replacement selections for said erroneous token.

13. The method of claim 1, wherein said syntactical analysis of said performing step includes transitioning between states of a finite state machine in response to said user input in accordance with predefined grammar rules in a grammar rule table representing syntax of an input language, each of said predefined grammar rules including a left-hand side nonterminal symbol associated with one or more right-hand side symbols, each of said states being associated with one of said predefined grammar rules and a right-hand side symbol, and wherein said step of transmitting one or more valid language options upon detection of an erroneous token, and said step of transmitting one or more subsequent language options in response to detecting no erroneous tokens further include the steps of:

retrieving grammar rule table indices from a cross-reference table using a state number as an index into said cross-reference table, said state number corresponding to one of said states;

retrieving a nonterminal symbol from said grammar rule table using said grammar rule table indices, said nonterminal symbol being a right-hand side symbol;

using said nonterminal symbol as a left-hand side symbol to retrieve from said grammar rule table any first occurring right-hand side symbols associated with grammar rules for which said nonterminal symbol is included as a left-hand side symbol; and transmitting said nonterminal symbol and said first occurring right-hand side symbols.

14. The method of claim 13 wherein, said steps of transmitting said one or more subsequent language options upon detection of no erroneous tokens, and transmitting one or more valid language options upon detection of an erroneous token further include the following steps when one of said language options transmitted is a nonterminal symbol having a null symbol as one of said first occurring right-hand side symbols, the method including the steps of:

providing an indicator denoting that said left-hand side nonterminal symbol is optional; and retrieving from an empty-goto table a subsequent recovery state corresponding to the next state to which processing resumes if said left-hand side nonterminal symbol is omitted.

15. The method of claim 14, wherein said step of providing an indicator includes the step of replacing the null symbol with a character sequence of one or more characters which are transmitted indicating that said left-hand side nonterminal symbol is optional.

16. The method of claim 14, wherein one of said language options transmitted is selected, and the method further includes the steps of:

determining if said one language option selected corresponds to said nonterminal symbol having a null symbol as a first occurring right-hand side symbol indicating that said nonterminal symbol is optional; and upon determining that said one language option selected is optional, performing the following steps:

restoring a current processing state to be said subsequent recovery state causing said performing step to resume lexical and syntactical processing.

17. The method of claim 1, wherein said syntactical analysis of said performing step includes transitioning between states of a finite state machine in response to said user input in accordance with predefined grammar rules in a grammar rule table representing syntax of an input language, each of said predefined grammar rules including a left-hand side nonterminal symbol associated with one or more right-hand side symbols, each of said states being associated with one of said predefined grammar rules and a right-hand side symbol, and the method further includes the steps of:

detecting a selection of a language option transmitted;

determining, in response to said detecting step, if said language option corresponds to a nonterminal symbol or a terminal symbol in which nonterminal symbols and terminal symbols appear in the right-hand side of grammar rules defining a syntax associated with said input language;

if said language option corresponds to a terminal symbol, performing the following steps:

including said terminal symbol into an edit buffer associated with said user input;

determining a next state of said finite state machine;

determining if said next state corresponds to a terminal symbol or a nonterminal symbol;

if said next state corresponds to a terminal symbol, including said terminal symbol and a trigger character in with said user input to trigger said performing step; and if said next state corresponds to a nonterminal symbol, expanding said nonterminal symbol in accordance with said grammar rules by determining which grammar rules have said nonterminal symbol as a left-hand side nonterminal symbol; and if said language option corresponds to a nonterminal symbol, performing the following step:

expanding said nonterminal symbol in accordance with said grammar rules by determining which of said grammar rules have said nonterminal symbol as a left-hand side nonterminal symbol.

18. The method of claim 1, wherein said syntactical analysis of said performing step includes transitioning between states of a finite state machine in response to said user input in accordance with predefined grammar rules in a grammar rule table representing syntax of an input language, each of said predefined grammar rules including a left-hand side nonterminal symbol associated with one or more right-hand side symbols, each of said states being associated with one of said predefined grammar rules and a right-hand side symbol, and in response to said performing step detecting no erroneous tokens, the method further includes the steps of:

determining a next state of said finite state machine;

determining if said next state corresponds to a terminal symbol or a nonterminal symbol;

upon determining that said next state corresponds to a terminal symbol, performing the following steps:

transmitting type information about said terminal symbol; and accepting additional input associated with said terminal symbol in accordance with said type information.

19. The method according to claim 18, wherein said step of transmitting type information includes the steps of:

determining a type of said terminal symbol;

upon determining that said terminal symbol is one of an integer or string, prompting the user for a specific value that is included in an edit buffer associated with said user input;

upon determining that said terminal symbol is a variable name, prompting the user for a specific value for said variable name; and upon determining that said terminal symbol corresponds to an optional argument, restoring a current processing state to be a previously saved subsequent optional state allowing said performing step to resume lexical and syntactical analysis.

20. The method of claim 1, wherein said input language is a programming language, said user input includes source code statements of said programming language.

21. The method of claim 1, wherein said lexical analysis of said performing step is performed using a lexical analyzer and said syntactical analysis of said performing step is performed using a syntax analyzer, said lexical analyzer being produced by a lexical analyzer generator, said syntax analyzer being produced by a syntax analyzer generator, said syntax analyzer generator producing an empty-goto table, and cross reference table, said empty-goto table defining a recovery state subsequent to an optional state corresponding to an optional language element, said recovery state indicating a state of which syntactical analysis resumes when an optional language element is skipped, and said cross reference table identifying, for a given state of a finite state machine used in said performing step, state information used to obtain a symbol denoting a language option corresponding to said state.

22. The method of claim 21 wherein said syntax analyzer generator produces a grammar rule table and a token name table, said grammar rule table including grammar rules defining syntax of said input language, each of said grammar rules including a left-hand side symbol and one or more corresponding right-hand side symbols, said left-hand side symbol being a nonterminal symbol, said right-hand side symbols including terminal and nonterminal symbols, nonterminal symbols being expandable in terms of other grammar rules included in said grammar rule table, said token name table being used to distinguish nonterminal symbols from terminal symbols included in said grammar rule table.

23. The method of claim 22, wherein an input set of syntax rules are input to said syntax analyzer generator defining syntax of said input language, said input set being in a form interpreted by said syntax analyzer generator, one or more action routines being specified in said set of syntax rules, a first action routine being associated with a first syntax rule of said set of syntax rules, said first action routine corresponding to code that is executed when processing said first syntax rule.

24. The method of claim 23, wherein said first action routine is used in preparing an income tax form.

25. The method of claim 23 further including the step of:

transmitting, responsive to detection of no erroneous tokens by said performing step, one or more subsequent language options.

26. The method of claim 1, wherein said step of detecting a trigger event in said user input includes the step of detecting a predetermined trigger character in said user input.

27. The method of claim 1, wherein said step of detecting a trigger event in said user input includes the step of selecting a menu item.

28. The method of claim 1, wherein said step of detecting a trigger event in said user input includes the step of detecting a verbal command.

29. The method of claim 1, wherein said lexical and syntactical analysis of said performing step is performed upon user input up to a specified cursor position or to the end of a file in accordance with a preselected analysis mode.

30. The method of claim 22, wherein said first action routine is used in preparing form-based input.

31. A memory for storing instructions executable by a computer, the memory comprising:

detector means for detecting a trigger event;

analysis means, coupled to said detector means, for performing lexical and syntactical analysis of user input represented by one or more tokens;

erroneous token detector means, coupled to said analysis means, for detecting an erroneous token in said user input, said erroneous token detector means transmitting one or more valid language options for use in place of said erroneous token; and means, coupled to said analysis means, for transmitting one or more subsequent language options if said analysis means detects only valid tokens;

wherein said erroneous token detector means and said means for transmitting include means for transmitting a menu of one or more symbols based upon grammar rules defining syntax rules of input language said menu including one or more first right hand side symbols corresponding to an expanded non-terminal symbol in accordance with said grammar rules defining syntax rules of said input language.

32. A computer system comprising:

user interface means for interfacing with a user to transmit input and output;

analysis means, coupled to said user interface means, for performing lexical and syntax analysis of user input;

error transmitter means, coupled to said analyzer means, for transmitting one or more options to said user interface means when said analysis means detects no errors in said user input, said one or more options representing one or more subsequent input options; and means for transmitting a menu of one or more symbols based upon grammar rules defining syntax rules of input language, said menu including one or more first right hand symbols corresponding to an expanded non-terminal symbol in accordance with said grammar rules defining syntax rules of said input language.

33. The computer system of claim 32, wherein said user interface means includes an editor and a system device.

34. An apparatus comprising:

an option selector for selecting an option from a transmitted menu of one or more options;

a menu processor, coupled to said option selector, which receives and processes said option selected with said option selector;

a lexical and syntax analyzer, coupled to said menu processor, which performs lexical and syntax analysis upon user input;

an error transmitter, coupled to said lexical and syntax analyzer, for transmitting said one or more options included in said transmitted menu when said lexical and syntax analyzer detects an error in said user input, said one or more options representing one or more valid options for use in correcting said error; and a transmitter, coupled to said lexical and syntax analyzer, for transmitting one or more options included in said transmitted menu when said lexical and syntax analyzer detects no errors in said user input, said one or more options representing one or more subsequent input options;

said transmitted menu including one or more symbols based upon grammar rules defining syntax rules of input language, said menu including one or more first right hand symbols corresponding to an expanded non-terminal symbol in accordance with said grammar rules defining syntax rules of said input language.

35. The apparatus of claim 34 further comprising:

an editor, coupled to said lexical and syntax analyzer, which transmits user input for processing to said lexical and syntax analyzer.

36. A method of performing grammar sensitive editing of user input represented by one or more tokens, said method comprising the steps of:

detecting a trigger event;

performing, in response to detection of said trigger event, lexical and syntactical analysis of user input; and transmitting, responsive to detection of no erroneous tokens by said performing step, one or more subsequent language options;

wherein the transmitting step includes transmitting a menu of one or more symbols based upon grammar rules defining syntax rules of input language, said menu including one or more first right hand side symbols corresponding to an expanded non-terminal symbol in accordance with said grammar rules defining syntax rules of said input language.

37. The method of claim 36 further including the step of:

transmitting, responsive to detection of an erroneous token by said performing step, one or more valid language options for use in place of said erroneous token.

38. A method of performing grammar sensitive editing of user input represented by one or more tokens, said method comprising the steps of:

detecting a trigger event;

performing, in response to detection of said trigger event, lexical and syntactical analysis of said user input; and transmitting, responsive to detection of an erroneous token by said performing step, one or more valid language options for use in place of said erroneous token;

wherein the step of transmitting includes transmitting one or more symbols based upon grammar rules defining syntax rules of input language, said menu including one or more first right hand side symbols corresponding to an expanded non-terminal symbol in accordance with said grammar rules defining syntax rules of said input language.

* * * * *